United States Patent
Hongo et al.

(10) Patent No.: US 10,298,440 B2
(45) Date of Patent: May 21, 2019

(54) TRANSMISSION APPARATUS, ALARM TRANSFER METHOD AND ALARM TRANSFER SYSTEM

(71) Applicant: FUJITSU LIMITED, Kawasaki-shi, Kanagawa (JP)

(72) Inventors: Jumpei Hongo, Kawasaki (JP); Takayuki Moriyama, Yokosuka (JP); Ryuichi Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 15/616,087

(22) Filed: Jun. 7, 2017

(65) Prior Publication Data
US 2017/0373924 A1 Dec. 28, 2017

(30) Foreign Application Priority Data
Jun. 22, 2016 (JP) ................. 2016-123354

(51) Int. Cl.
*H04L 12/24* (2006.01)
*H04L 12/26* (2006.01)
(Continued)

(52) U.S. Cl.
CPC ......... *H04L 41/0604* (2013.01); *H04B 10/00* (2013.01); *H04J 14/02* (2013.01);
(Continued)

(58) Field of Classification Search
CPC ...... H04B 10/00; H04J 14/02; H04L 41/0246; H04L 41/06; H04L 41/0604;
(Continued)

(56) References Cited

U.S. PATENT DOCUMENTS

2005/0249119 A1* 11/2005 Elie-Dit-Cosaque ..................... H04L 12/2856 370/236
2007/0223917 A1 9/2007 Nagamine
(Continued)

FOREIGN PATENT DOCUMENTS

| JP | 2000-31919 | 1/2000 |
| JP | 2007-259316 | 10/2007 |
| JP | 2008-244823 | 10/2008 |

*Primary Examiner* — Awet Haile
(74) *Attorney, Agent, or Firm* — Staas & Halsey LLP

(57) ABSTRACT

A transmission apparatus executes a reception processing that receives a first alarm detected in a first transmission apparatus different from the own apparatus from among a plurality of transmission apparatus from a second transmission apparatus different from the own apparatus from among the plurality of transmission apparatus, executes a detection processing that detects a second alarm of the own apparatus, executes a mask processing that masks alarms including the first alarm received by the reception processing and the second alarm detected by the detection processing, and executes a sending processing that sends an alarm that is not masked by the mask processing from among the alarms to a third transmission apparatus different from the own apparatus and the second transmission apparatus from among the plurality of transmission apparatus or sending the alarm to a given apparatus different from any of the plurality of transmission apparatus.

10 Claims, 27 Drawing Sheets

(51) Int. Cl.
  *H04B 10/00* (2013.01)
  *H04J 14/02* (2006.01)
(52) U.S. Cl.
  CPC .......... *H04L 41/06* (2013.01); *H04L 41/0631* (2013.01); *H04L 41/0686* (2013.01); *H04L 41/0246* (2013.01); *H04L 41/0654* (2013.01); *H04L 43/08* (2013.01)
(58) Field of Classification Search
  CPC ............. H04L 41/0631; H04L 41/0654; H04L 41/0686; H04L 43/08
  See application file for complete search history.

(56) References Cited

U.S. PATENT DOCUMENTS

| | | | |
|---|---|---|---|
| 2008/0240710 A1 | 10/2008 | Nishioka | |
| 2011/0008041 A1* | 1/2011 | Uchiyama | H04J 14/0212 398/30 |
| 2011/0279258 A1* | 11/2011 | Unger | H04L 41/0627 340/501 |

* cited by examiner

FIG. 3

| WDM TRANSMISSION APPARATUS NAME (BLADE NAME) | CATEGORY | ALARM NAME |
|---|---|---|
| AMP | EQPT | RMVD,MEA,FLT,SWRESET,WARMUP AND SO FORTH |
| | Port | INDWN,POS AND SO FORTH |
| | Interface | BDI-O,LOS,PMI,POS,LOF,Nolight AND SO FORTH |
| DAMP | EQPT | RMVD,MEA,FLT,SWRESET,WARMUP AND SO FORTH |
| | Port | INDWN,MUX/DEMUX-INDWN AND SO FORTH |
| WSS | EQPT | RMVD,MEA,FLT,SWRESET,WARMUP AND SO FORTH |
| | Port | INDWN AND SO FORTH |
| MUX/DEMUX | EQPT | MEA AND SO FORTH |
| TRPN | EQPT | RMVD,MEA,FLT,SWRESET,WARMUP AND SO FORTH |
| | Port | POS AND SO FORTH |
| | Interface | LOS,LOM,LTXOFF,BDI,AIS AND SO FORTH |

FIG. 14

| ALARM NAME | BLADE NAME | PORT INFORMATION | WAY INFORMATION | CH INFORMATION | ADD/DROP INFORMATION | |
|---|---|---|---|---|---|---|
| A | AMP | 1 | 1 | 1 | ADD | |
| B | AMP | 1 | 1 | 3 | ADD | ~ 1401 |
| A | WSS | 1 | 1 | 3 | ADD | ~ 1402 |
| C | WSS | 1 | 1 | 2 | ADD | |

1400

TRANSMISSION APPARATUS, ALARM TRANSFER METHOD AND ALARM TRANSFER SYSTEM

CROSS-REFERENCE TO RELATED APPLICATION

This application is based upon and claims the benefit of priority of the prior Japanese Patent Application No. 2016-123354, filed on Jun. 22, 2016, the entire contents of which are incorporated herein by reference.

FIELD

The present embodiment relates to a transmission apparatus, an alarm transfer method and an alarm transfer system.

BACKGROUND

In a wavelength division multiplexing (WDM) transmission system in a related art, a plurality of optical signals having wavelengths different from each other may be multiplexed and transmitted at the same time. Further, in a related art, presence or absence of a failure in an optical path may be decided based on a result of comparison of alarm states of an optical path. Further, in another related art, alarms detected in a WDM transmission apparatus used in a WDM transmission system may be aggregated by an aggregation apparatus and transferred to a network management server.

Examples of the related art include Japanese Laid-open Patent Publication No. 2008-244823.

SUMMARY

According to an aspect of the embodiment, a transmission apparatus included in a plurality of transmission apparatus that are coupled to each other and communicate with each other includes: a memory; and a processor coupled to the memory and configured to execute a reception process that includes receiving a first alarm detected in a first transmission apparatus different from the own apparatus from among the plurality of transmission apparatus from a second transmission apparatus different from the own apparatus from among the plurality of transmission apparatus, execute a detection process that includes detecting a second alarm of the own apparatus, execute a mask process that includes masking alarms including the first alarm received by the reception process and the second alarm detected by the detection process, and execute a sending process that includes sending an alarm that is not masked by the mask process of the processor from among the alarms to a third transmission apparatus different from the own apparatus and the second transmission apparatus from among the plurality of transmission apparatus or sending the alarm to a given apparatus different from any of the plurality of transmission apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of alarms generated in a WDM transmission apparatus according to the embodiment;

FIG. 14 is a view illustrating an example of an alarm management table stored in a WDM transmission apparatus according to the embodiment;

DESCRIPTION OF EMBODIMENT

For example, where an aggregation apparatus is not provided in the WDM transmission system, alarms detected in each WDM transmission apparatus are transferred to the network management server. Therefore, there may be a problem that increased traffic is desirable for transfer of alarms.

As one aspect of the present embodiment, provided are solutions for being able to reduce the traffic desirable for transfer of alarms.

In the following, an embodiment of a transmission apparatus, an alarm transfer method and an alarm transfer system according to the present technology is described in detail with reference to the drawings.

Figure 1:
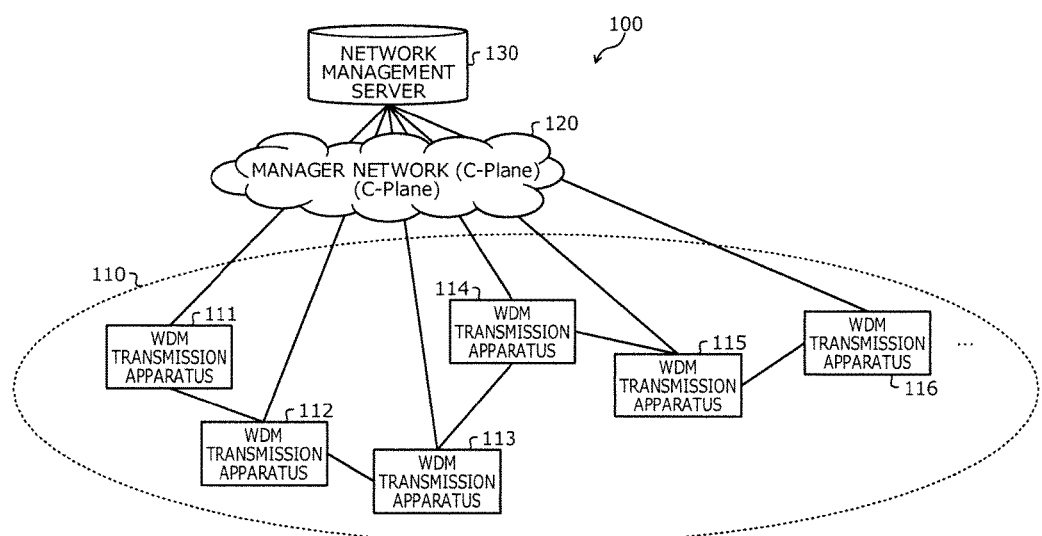
FIG. 1 is a view depicting an example of an alarm transfer system according to an embodiment.

FIG. 1 is a view depicting an example of an alarm transfer system according to an embodiment. As depicted in FIG. 1, an alarm transfer system 100 according to the embodiment includes a WDM transmission system 110, a manager network 120 and a network management server 130. The alarm transfer system 100 is a system that transfers, for example, an alarm generated in the WDM transmission system 110 to the network management server 130 through the manager network 120.

The WDM transmission system 110 is an optical communication system in which a plurality of WDM transmission apparatus (WDM transmission apparatus 111 to 116 and so forth) are coupled at multi-stages to each other. In the example depicted in FIG. 1, the WDM transmission apparatus 111 to 116 are blade type transmission apparatus that are coupled to each other and perform communication (for example, optical transmission) with each other. For example, the WDM transmission apparatus 111 to 116 and so forth form an optical path by series coupling to each other and transmit an optical signal without converting the optical signal into an electric signal.

Further, the WDM transmission apparatus 111 to 116 and so forth are coupled to the network management server 130 through the manager network 120. However, all of the WDM transmission apparatus 111 to 116 and so forth may not be coupled to the network management server 130, but at least one of the WDM transmission apparatus 111 to 116 and so forth may be coupled to the network management server 130.

Further, the WDM transmission system 110 is a blade type WDM transmission system in which blade type WDM transmission apparatus 111 to 116 and so forth are coupled to each other without using, for example, a centralized management apparatus for centrally managing the coupling relationship and so forth of the WDM transmission apparatus 111 to 116 and so forth.

The manager network 120 is a network for transmitting a signal of a control plane (C-Plane) in the alarm transfer system 100. An alarm detected in the WDM transmission system 110 is transferred to the network management server 130 through the manager network 120. However, the alarm transfer system 100 may be configured such that the manager network 120 is omitted and the WDM transmission system 110 and the network management server 130 are directly coupled to each other.

The network management server 130 is a server that performs management of the WDM transmission system 110 through the manager network 120. The management of the WDM transmission system 110 includes monitoring of an alarm generated in the WDM transmission apparatus 111 to 116 and so forth of the WDM transmission system 110. For example, the network management server 130 is a maintenance operation system such as an operation system (OPS).

Figure 2:
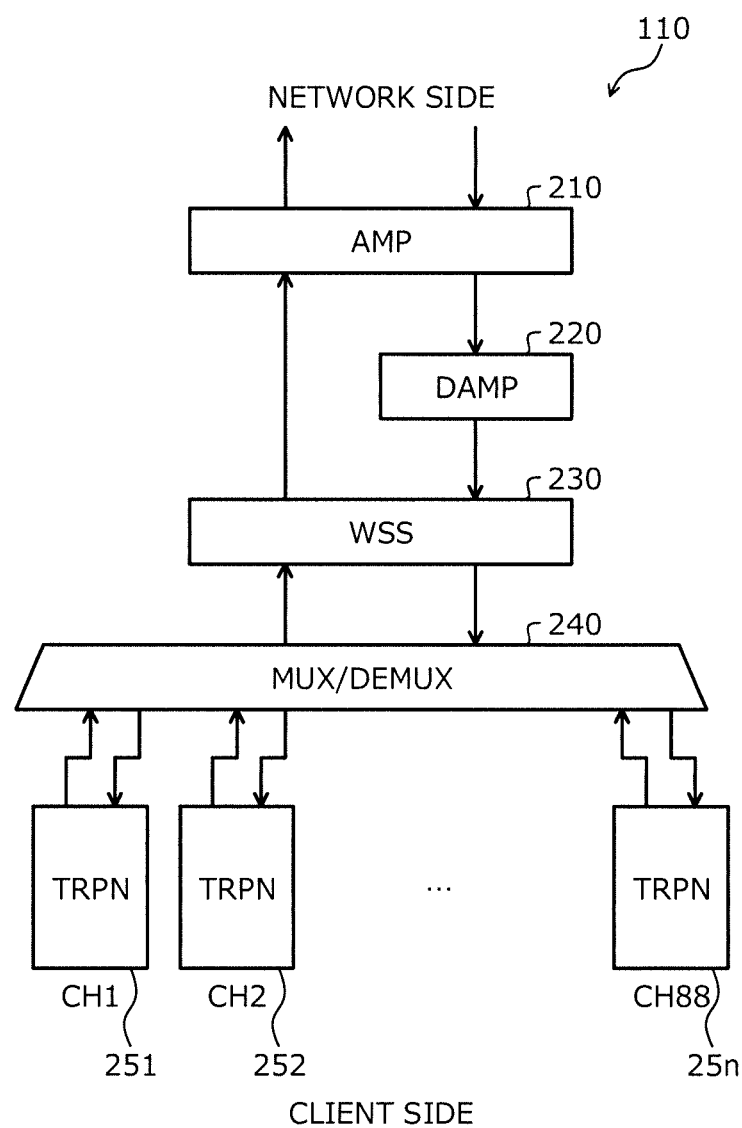
FIG. 2 is a view depicting an example of a WDM transmission system according to the embodiment.

FIG. 2 is a view depicting an example of a WDM transmission system according to the embodiment. FIG. 2 illustrates a case in which the WDM transmission system 110 depicted in FIG. 1 is an optical add drop multiplexer (OADM) that performs branching (DROP) and insertion (ADD) of an optical signal in a unit of an optical wavelength.

In this case, the WDM transmission system 110 includes, as a plurality of WDM transmission apparatus, an AMP 210, a DAMP 220, a WSS 230, a MUX/DEMUX 240 and TRPNs 251 to 25n as depicted in FIG. 2. The WDM transmission apparatus have a multistage configuration in which they are coupled to each other by an optical fiber or the like.

AMP is an abbreviation of amplifier. DAMP is an abbreviation of drop amplifier. WSS is an abbreviation of wavelength selective switch. MUX/DEMUX is an abbreviation of multiplexer/demultiplexer. TRPN is an abbreviation of transponder.

In the WDM transmission system 110, the downlink optical transmission direction from the network side to the client side is referred to as DROP direction and the uplink optical transmission direction from the client side to the network side is referred to as ADD direction.

The AMP 210 amplifies an optical signal in the DROP direction sent from the network side and outputs the amplified optical signal in the DROP direction to the DAMP 220. Further, the AMP 210 amplifies an optical signal in the ADD direction outputted from the WSS 230 and sends the amplified optical signal in the ADD direction to the network side.

The DAMP 220 amplifies an optical signal in the DROP direction outputted from the AMP 210 and outputs the amplified optical signal in the DROP direction to the WSS 230. In the example of FIG. 2, while the DAMP 220 is provided between the AMP 210 and the WSS 230, the DAMP 220 may be provided otherwise between the WSS 230 and the MUX/DEMUX 240.

The WSS 230 performs wavelength selection switching of an optical signal in the DROP direction outputted from the DAMP 220 and outputs the optical signal in the DROP direction for which the wavelength selection switching is performed to the MUX/DEMUX 240. Further, the WSS 230 performs wavelength selection switching of an optical signal in the ADD direction outputted from the MUX/DEMUX 240 and outputs the optical signal in the ADD direction for which the wavelength selection switching is performed to the AMP 210.

The MUX/DEMUX 240 performs wavelength demultiplexing (branching) of an optical signal in the DROP direction outputted from the WSS 230 and outputs each optical signal in the DROP direction obtained by the wavelength demultiplexing to the respective TRPNs 251 to 25n. Further, the MUX/DEMUX 240 wavelength multiplexes each optical signal in the ADD direction outputted from the TRPNs 251 to 25n and outputs the optical signal obtained by the wavelength multiplexing to the WSS 230.

Each of the TRPNs 251 to 25n receives optical signals in the DROP direction outputted from the MUX/DEMUX 240 and outputs the signals (electric signals) in the DROP direction obtained by the optical reception to the client side. Further, each of the TRPNs 251 to 25n converts signals (electric signals) in the ADD direction inputted thereto from the client side into optical signals having wavelengths different from each other, and outputs the converted optical signals in the ADD direction to the MUX/DEMUX 240. In the example depicted in FIG. 2, 88 TRPNs 251 to 25n (n=88) corresponding to 88 channels (CH1 to CH88) are provided.

As depicted in FIG. 2, the WDM transmission system 110 has a multistage configuration from a plurality of WDM transmission apparatus. Therefore, if a certain WDM transmission apparatus malfunctions and a failure (hereinafter referred to as cause failure) occurs with the WDM transmission apparatus, a large number of failures spreading from the cause failure will be generated in WDM transmission apparatus at succeeding stages on a path for optical transmission (a failure spreading from a cause failure is hereinafter referred to as spread failure). In the following description, an alarm indicative of a cause failure is referred to as cause alarm and an alarm indicative of a spread failure is referred to as spread alarm.

FIG. 3 is a view illustrating an example of alarms generated in a WDM transmission apparatus according to the embodiment. In each of the WDM transmission apparatus in the WDM transmission system 110, for example, each alarm indicated in a table 300 of FIG. 3 is generated. A category indicated in the table 300 indicates a generation range of an alarm. For example, EQPT of the category indicates an alarm whose target is the entirety of an interface card and the WDM transmission apparatus. Port of the category indicates an alarm whose target is a port of the WDM transmission apparatus. Interface of the category indicates an alarm whose target is an interface (facility) of the WDM transmission apparatus.

For example, as an alarm that is generated in the AMP 210 depicted in FIG. 2 and whose category is EQPT, RMVD, MEA, FLT, SWRESET, WARMUP and so forth are available. Further, as an alarm that is generated in the AMP 210 and whose category is Port, INDWN, POS and so forth are available. Further, as an alarm that is generated in the AMP 210 and whose category is Interface, BDI-O, LOS, PMI, POS, LOF, Nolight and so forth are available.

Similarly, alarms of the various categories are set also for each of the DAMP 220, WSS 230, MUX/DEMUX 240 and TRPNs 251 to 25n. As depicted in FIG. 3, among the WDM transmission apparatus in the WDM transmission system 110, an alarm to be generated differs for each type of the WDM transmission apparatus.

Figure 4:
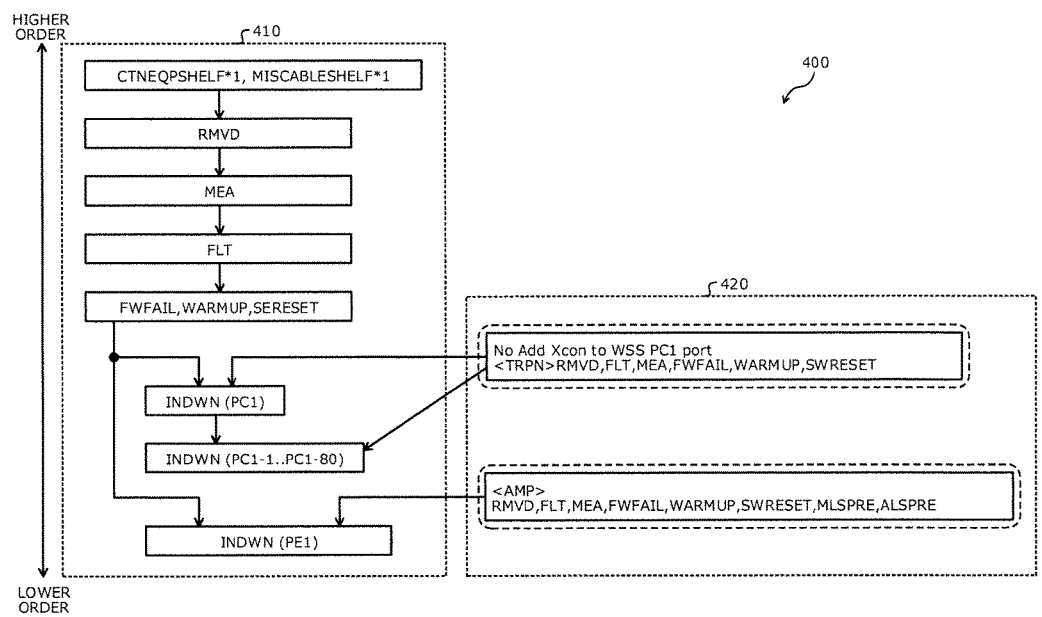
FIG. 4 is a view illustrating an example of an alarm mask hierarchy in a WDM transmission apparatus according to the embodiment.

FIG. 4 is a view illustrating an example of an alarm mask hierarchy in a WDM transmission apparatus according to the embodiment. In FIG. 4, an alarm mask hierarchy 400 in the ADD direction of the WSS 230 is illustrated as an example. The WSS 230 performs an alarm mask process for an alarm in the ADD direction using the alarm mask hierarchy 400 depicted in FIG. 4. As an example, the alarm mask process is a process for masking an alarm detected in a WDM transmission apparatus at the downstream on a path for optical transmission from among alarms detected on the same path. The process for masking an alarm is a process, for example, for suppressing sending of the alarm to an apparatus at the downstream on a path for alarm transfer.

In the alarm mask hierarchy 400, for example, PC1 indicates that a port number at the client side of the WSS 230=1. PE1 indicates that a port number at the network side of the WSS 230=1.

Each of character strings in rectangles in the alarm mask hierarchy 400 corresponds to an alarm. An alarm group 410 in the alarm mask hierarchy 400 indicates alarms generated in the WSS 230. Another alarm group 420 in the alarm mask hierarchy 400 indicates alarms generated in a WDM transmission apparatus different from the WSS 230.

An alarm that is indicated at a higher position in FIG. 4 in the alarm mask hierarchy 400 indicates a higher order (higher priority rank) alarm. For example, if a plurality of alarms are generated at the same time, a hierarchical relationship (priority order) of the generated alarms is decided based on the alarm mask hierarchy 400 by software and a lower order alarm (alarm having a lower priority rank) is masked. This is referred to as alarm mask process. By performing the alarm mask process in accordance with the alarm mask hierarchy 400, the alarm mask hierarchy 400 is created such that an alarm indicating a spread failure more remote from a cause failure is masked.

The alarm mask hierarchy 400 may, for example, be implemented by a table indicating, for each of alarms capable of making a target of the alarm mask process by the WSS 230, alarms each having a higher order than that of the alarm, for example, alarms that mask the alarm. The alarms capable of making a target of the alarm mask process of the WSS 230 include alarms indicating failures of the WSS 230 capable of being detected by the WSS 230 and alarms capable of being received from a different WDM transmission apparatus by the WSS 230.

While the alarm mask hierarchy 400 in the ADD direction of the WSS 230 is described with reference to FIG. 4, also an alarm mask hierarchy in the DROP direction of the WSS 230 is set to the WSS 230. Further, alarm mask hierarchies in the ADD direction and the DROP direction are set similarly to each of the AMP 210, DAMP 220, MUX/DEMUX 240 and TRPNs 251 to 25n.

Figure 5:
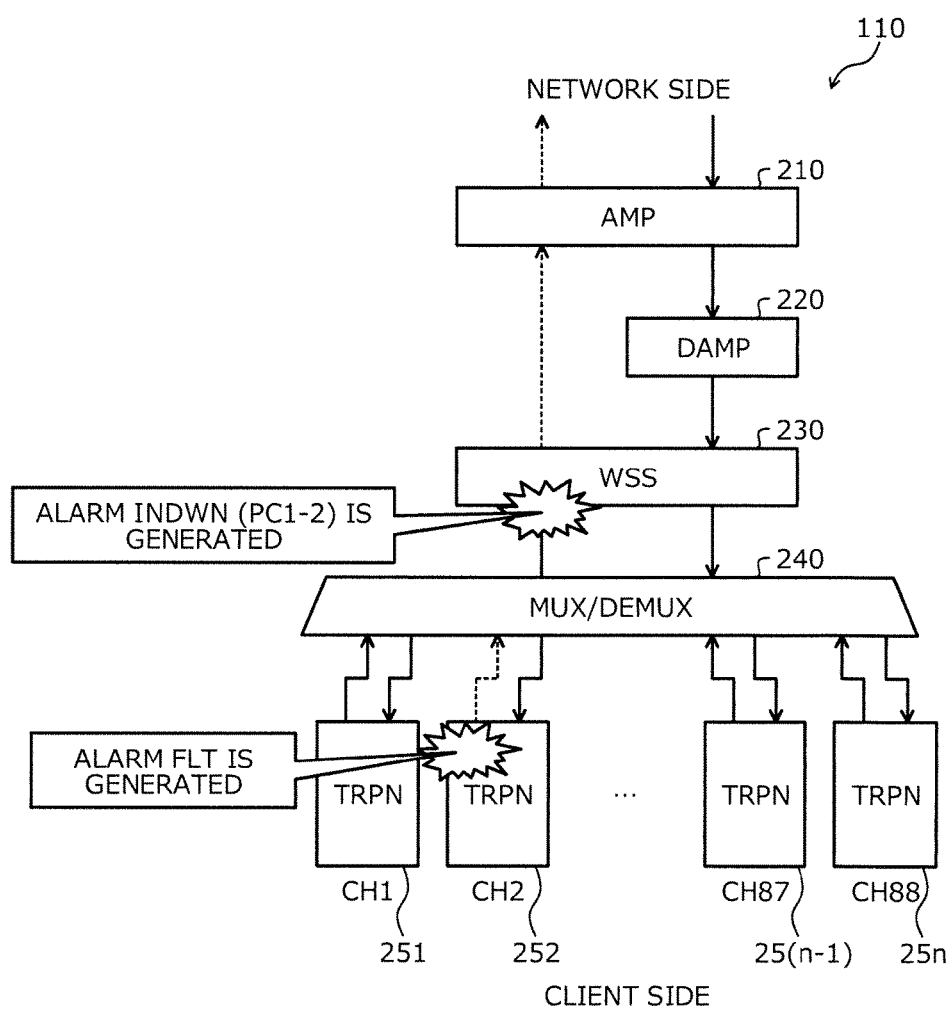
FIG. 5 is a view illustrating an example of generation of an alarm in a WDM transmission system according to the embodiment.

FIG. 5 is a view illustrating an example of generation of an alarm in a WDM transmission system according to the embodiment. In FIG. 5, like elements to those in FIG. 2 are denoted by the same reference symbols, and overlapping description of them is omitted herein. For example, it is assumed that the TRPN 252 of the channel CH2 malfunctions and an alarm FLT (malfunction of the apparatus itself) is generated in the TRPN 252.

Then, it is assumed that, by spreading from the malfunction of the TRPN 252, an alarm INDWN (PC1-2) is generated in the WSS 230 at the downstream (at the succeeding stage) with respect to the TRPN 252 in the ADD direction. The alarm INDWN (PC1-2) signifies, for example, that light is interrupted in the channel #2 of the port #1 of the WSS 230 at the client side.

In this case, if the WSS 230 performs an alarm mask process for the alarms, since the alarm INDWN (PC1-2) is lower order than the alarm FLT in the alarm mask hierarchy 400 illustrated in FIG. 4, the alarm INDWN (PC1-2) is masked.

Figure 6:
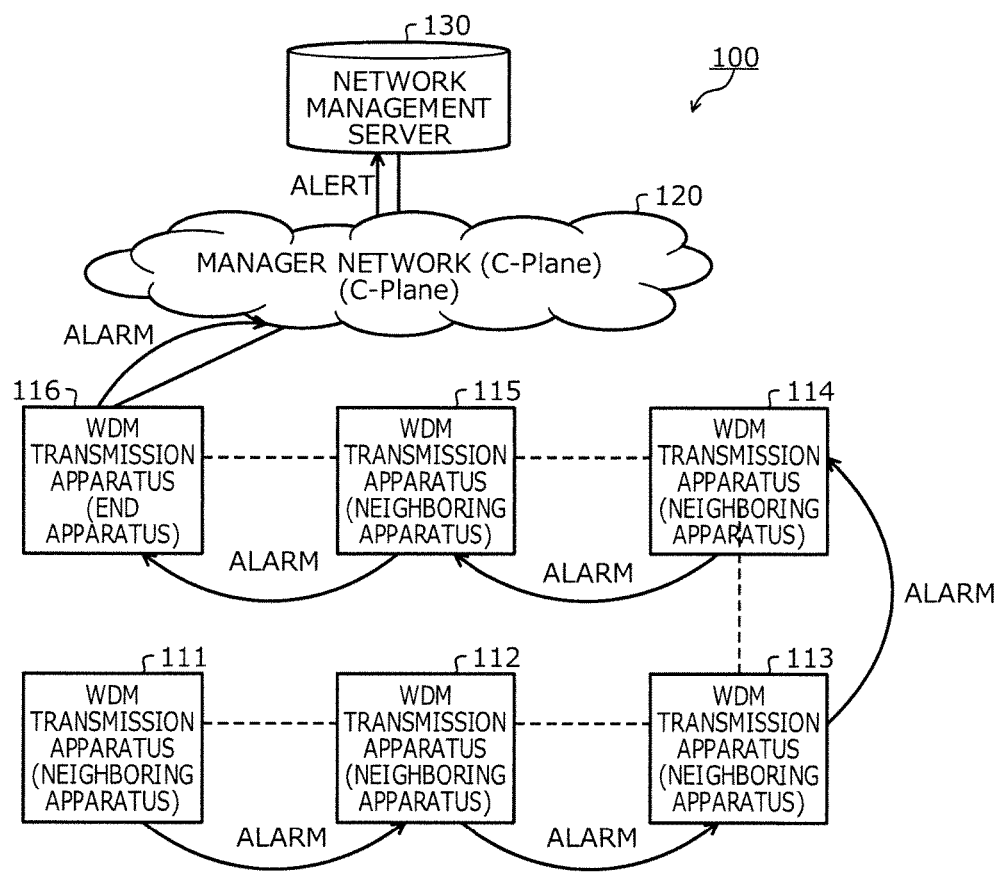
FIG. 6 is a view illustrating an example of transfer of an alarm in an alarm transfer system according to the embodiment.

FIG. 6 is a view illustrating an example of transfer of an alarm in an alarm transfer system according to the embodiment. In FIG. 6, like elements to those depicted in FIG. 1 are denoted by the same reference symbols, and overlapping description of them is omitted herein. In the alarm transfer system 100 according to the embodiment, each of the WDM transmission apparatus of the WDM transmission system 110 forms a path for alarm transfer along which an alarm is to be transferred between WDM transmission apparatus in a bucket relay fashion as illustrated in FIG. 6.

Further, each of the WDM transmission apparatus of the WDM transmission system 110 carries out an alarm mask process, and an alarm that is not masked by each of the WDM transmission apparatus is reported to the network management server 130 by the WDM transmission apparatus at the most downstream on the path for alarm transfer. The path for alarm transfer may be same as the path for optical transmission by each of the WDM transmission apparatus of the WDM transmission system 110 or may be a path different from the path for optical transmission by each of the WDM transmission apparatus of the WDM transmission system 110.

In order to make it possible for each WDM transmission apparatus to perform an alarm mask process, when each WDM transmission apparatus is to send an alarm to a WDM transmission apparatus at the downstream on the path for alarm transfer, the WDM transmission apparatus adds alarm additional information with which coupling information between the apparatus may be specified and sends the resulting alarm. Then, each WDM transmission apparatus specifies, when it receives an alarm from a different WDM transmission apparatus, coupling information between the WDM transmission apparatus based on the alarm additional information added to the received alarm and performs an alarm mask process in accordance with the alarm mask hierarchy.

The path for alarm transfer is implemented, for example, by the C-Plane between WDM transmission apparatus. Alternatively, the path for alarm transfer may be implemented by a control channel for optical transmission performed by each WDM transmission apparatus or may be implemented by a communication channel different from a communication channel for optical transmission performed by each WDM transmission apparatus. In the example depicted in FIG. 6, a path for alarm transfer along which the WDM transmission apparatus 111 to 116 are coupled in series is formed. The WDM transmission apparatus 111 to 116 may be coupled directly to each other or may be coupled indirectly to each other through a hub or the like.

The WDM transmission apparatus 111 is a WDM transmission apparatus at the most upstream on the path for alarm transfer from among the WDM transmission apparatus 111 to 116. Meanwhile, the WDM transmission apparatus 116 is a WDM transmission apparatus at the most downstream on the path for alarm transfer from among the WDM transmission apparatus 111 to 116. In the following description, the WDM transmission apparatus 116 at the most downstream on the path for alarm transfer from among the WDM transmission apparatus 111 to 116 is referred to as end apparatus. Meanwhile, the WDM transmission apparatus 111 to 115 that are not end apparatus from among the WDM transmission apparatus 111 to 116 are referred to as neighboring apparatus.

As depicted in FIG. 6, when the WDM transmission apparatus 111 to 116 individually perform an alarm mask process to transfer an alarm, the WDM transmission apparatus 116 as an end apparatus may specify a cause alarm and send the specified cause alarm to the network management server 130. Consequently, the number of alarms to be transmitted between the WDM transmission apparatus 111 to 116 and the manager network 120 may be reduced to achieve reduction of the communication amount. Further, the network management server 130 becomes easier to specify a cause failure and may perform rapid restoration against the failure.

Figure 7:
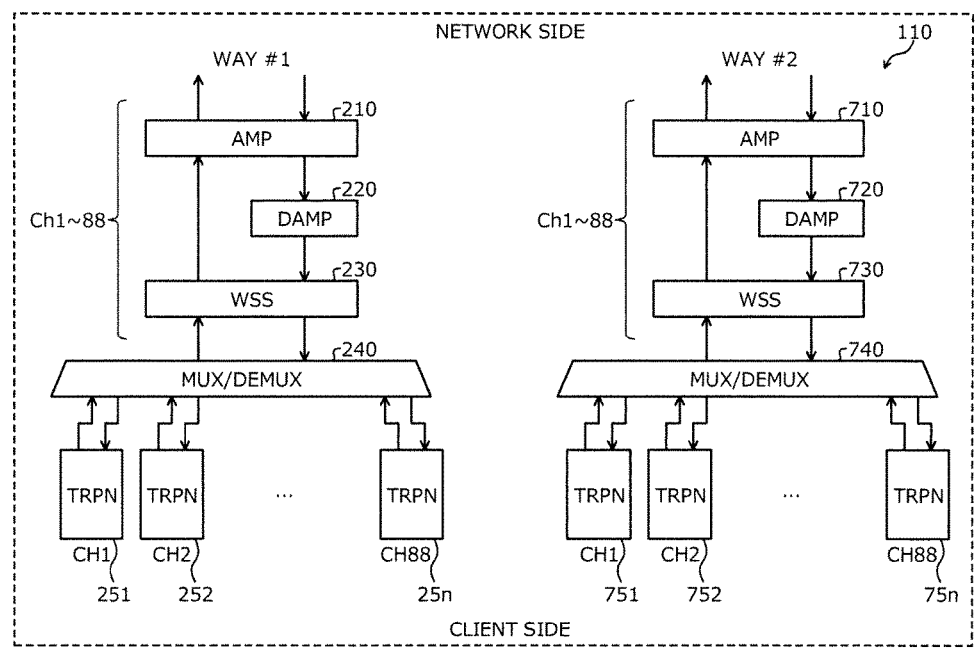
FIG. 7 is a view depicting a different example of a WDM transmission system according to the embodiment.

FIG. 7 is a view depicting a different example of a WDM transmission system according to the embodiment. In FIG. 7, like elements to those depicted in FIG. 2 are denoted by the same reference symbols, and overlapping description of them is omitted herein. The WDM transmission system 110 may include as depicted in FIG. 7, AMPs 210 and 710, DAMPs 220 and 720, WSSs 230 and 730, MUX/DEMUXes 240 and 740, and TRPNs 251 to 25*n* and 751 to 75*n*.

In the WDM transmission system 110, the direction at the network side is determined for each AMP and is referred to as way. The example depicted in FIG. 7 includes a way #1 corresponding to the AMP 210 and another way #2 corresponding to the AMP 710. In the example depicted in FIG. 7, the AMP 210, DAMP 220, WSS 230, MUX/DEMUX 240 and TRPNs 251 to 25*n* are WDM transmission apparatus corresponding to the way #1 at the network side.

The AMP 710, DAMP 720, WSS 730, MUX/DEMUX 740 and TRPNs 751 to 75*n* are WDM transmission apparatus corresponding to the way #2 at the network side. Further, the AMP 710, DAMP 720, WSS 730, MUX/DEMUX 740 and TRPNs 751 to 75*n* are configured similarly to the AMP 210, DAMP 220, WSS 230, MUX/DEMUX 240 and TRPNs 251 to 25*n*, respectively.

While FIG. 7 depicts a configuration in which the WDM transmission system 110 has two ways, the number of ways of the WDM transmission system 110 may be one (for example, refer to FIG. 2) or three or more without limiting to two.

Figure 8:
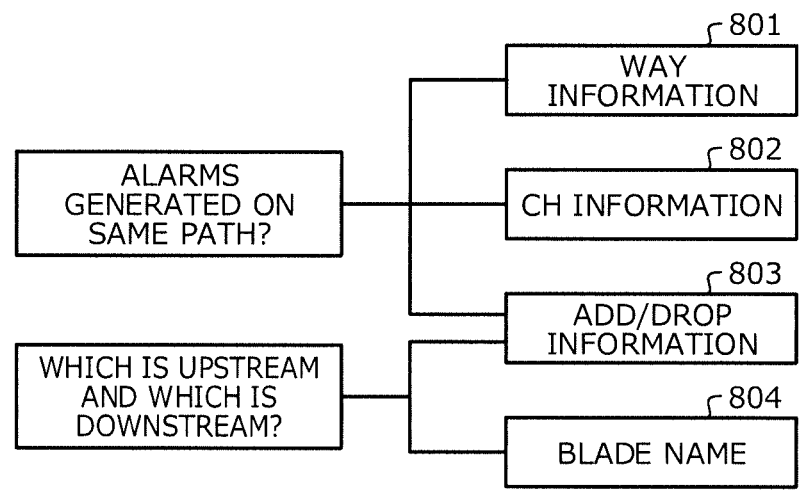
FIG. 8 is a view illustrating an example of information used in an alarm mask process by a WDM transmission apparatus according to the embodiment.

FIG. 8 is a view illustrating an example of information used in an alarm mask process by a WDM transmission apparatus according to the embodiment. When each of the WDM transmission apparatus of the WDM transmission system 110 is to perform an alarm mask process, it decides, for example, for each of alarms, whether or not the alarms are generated on the same path and which one of the alarms is at the upstream or the downstream.

The decision regarding which one of the alarms is at the upstream or the downstream is, for example, a decision of which one of the alarms is generated in a WDM transmission apparatus at the more upstream on a path for optical transmission and which one of the alarms is generated in a WDM transmission apparatus at the more downstream on the path for optical transmission. In order to perform the decisions, each WDM transmission apparatus of the WDM transmission system 110 uses, for example, for each alarm, way information 801, CH information 802, ADD/DROP information 803 and a blade name 804 as the alarm additional information described hereinabove.

The way information 801 is information indicative of to which way an optical path in which a target alarm is generated belongs. The CH information 802 is information indicative of to which wavelength channel an optical path in which the target alarm is generated belongs. The ADD/DROP information 803 is information indicative of to which signal direction between the ADD direction and the DROP direction an optical path in which the target alarm is generated belongs. The blade name 804 is information indicative of a type of a WDM transmission apparatus (WDM blade) in which the target alarm is detected.

For example, by using the way information 801, CH information 802 and ADD/DROP information 803, it may be decided for each combination of alarms whether or not the alarms of the combination are generated on the same path for optical transmission. For example, since alarms that coincide with each other in all of the way information 801, CH information 802 and ADD/DROP information 803 are alarms generated on the same path for optical transmission, it may be decided that they make a mask target with each other in an alarm mask process. Such alarms make a target of an alarm mask process.

Further, since alarms that do not coincide with each other in at least one of the way information 801, CH information 802 and ADD/DROP information 803 are alarms generated on different paths for optical transmission from each other, it may be decided that the alarms do not make a mask target with each other in an alarm mask process.

Further, by using the ADD/DROP information 803 and the blade name 804, it may be decided which one of alarms decided that they make a mask target with each other in an alarm mask process is at the upstream or at the downstream.

Accordingly, an alarm mask process may be performed using the way information 801, CH information 802, ADD/DROP information 803 and blade name 804 described above and an alarm mask hierarchy (for example, the alarm mask hierarchy 400 illustrated in FIG. 4).

Figure 9:
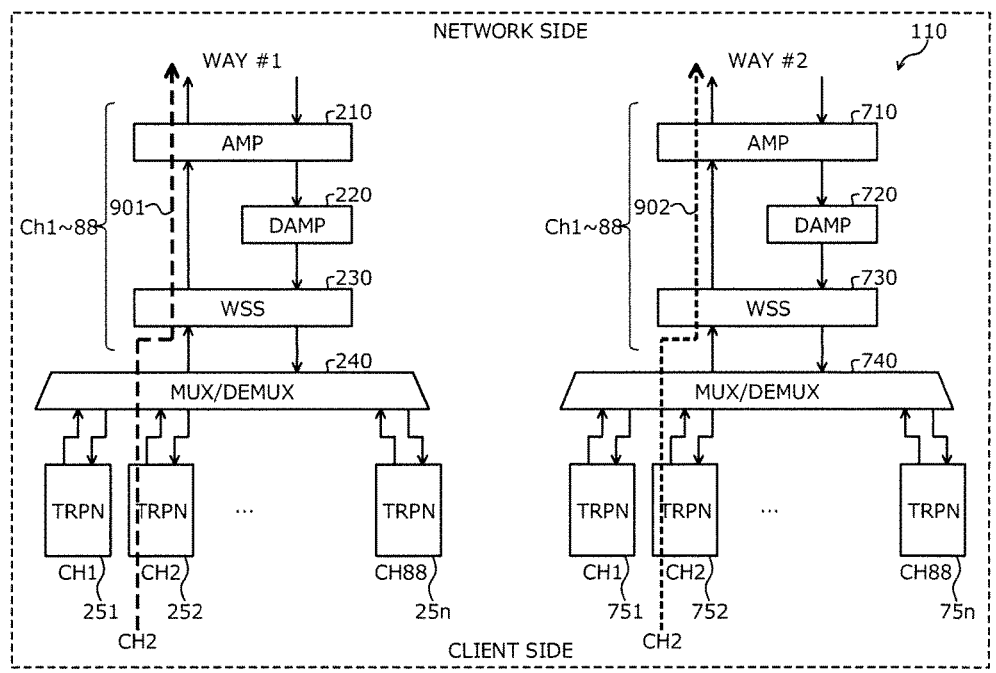
FIG. 9 is a view illustrating an example of a case in which pieces of way information of alarms generated in a WDM transmission system according to the embodiment are different from each other.

FIG. 9 is a view illustrating an example of a case in which pieces of way information of alarms generated in a WDM transmission system according to the embodiment are different from each other. In FIG. 9, like elements to those depicted in FIG. 7 are denoted by the same reference symbols, and overlapping description of them is omitted herein. A path 901 depicted in FIG. 9 is a path of a way #1, and a path 902 depicted in FIG. 9 is a path of a way #2. Accordingly, since an alarm indicative of a failure generated on the path 901 and an alarm indicative of a failure generated on the path 902 are different from each other in way information 801, they do not make mask targets of each other in an alarm mask process.

Figure 10:
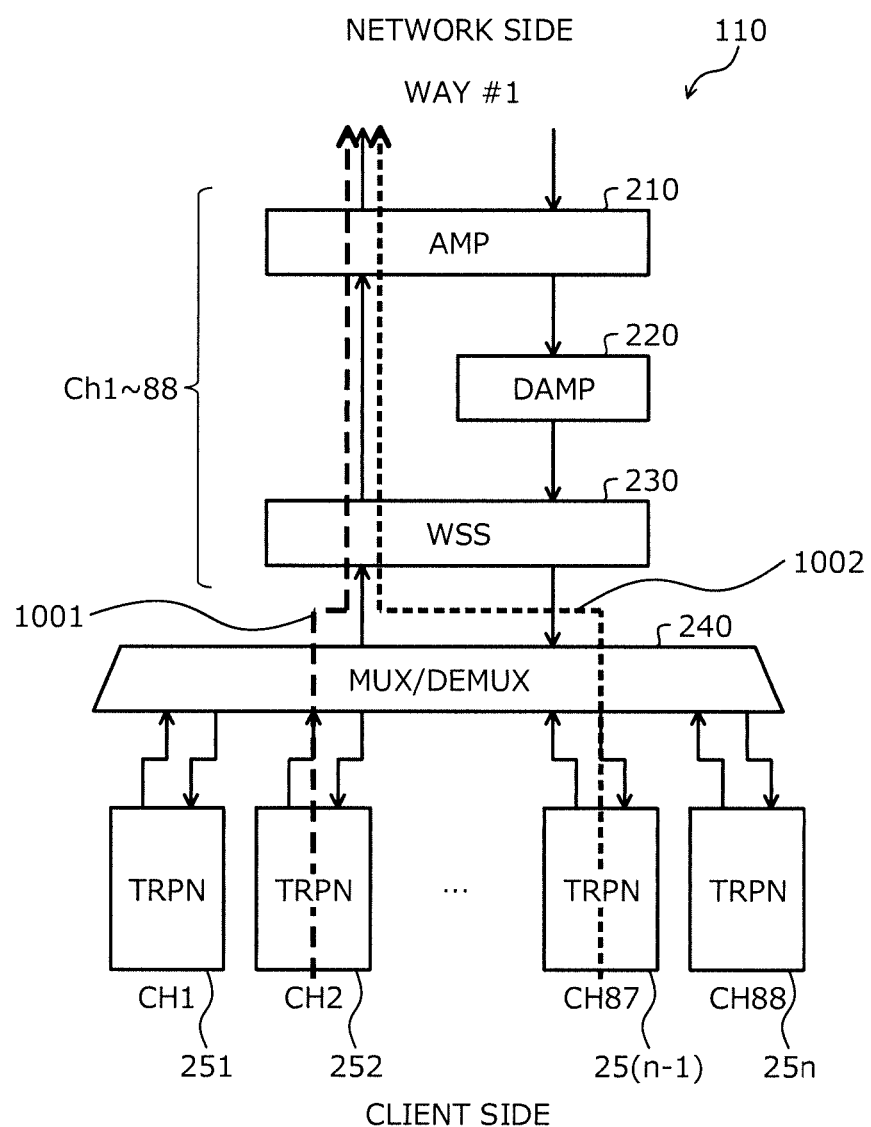
FIG. 10 is a view illustrating an example of a case in which pieces of CH information of alarms generated in a WDM transmission system according to the embodiment are different from each other.

FIG. 10 is a view illustrating an example of a case in which pieces of CH information of alarms generated in a WDM transmission system according to the embodiment are different from each other. In FIG. 10, like elements to those depicted in FIG. 2 are denoted by the same reference symbols, and overlapping description of them is omitted herein. A path 1001 depicted in FIG. 10 is a path of the channel CH2, and a path 1002 depicted in FIG. 10 is a path of the channel CH87.

Accordingly, since an alarm indicative of a failure generated on the path 1001 and an alarm indicative of a failure generated on the path 1002 are different from each other in CH information 802, they do not make mask targets of each other in an alarm mask process. The alarm indicative of a failure generated on the path 1001 is, as an example, an alarm of the TRPN 252 of the channel CH2. The alarm indicative of a failure generated on the path 1002 is, as an example, the alarm INDWN (PC1-87) of the WSS 230.

Figure 11:
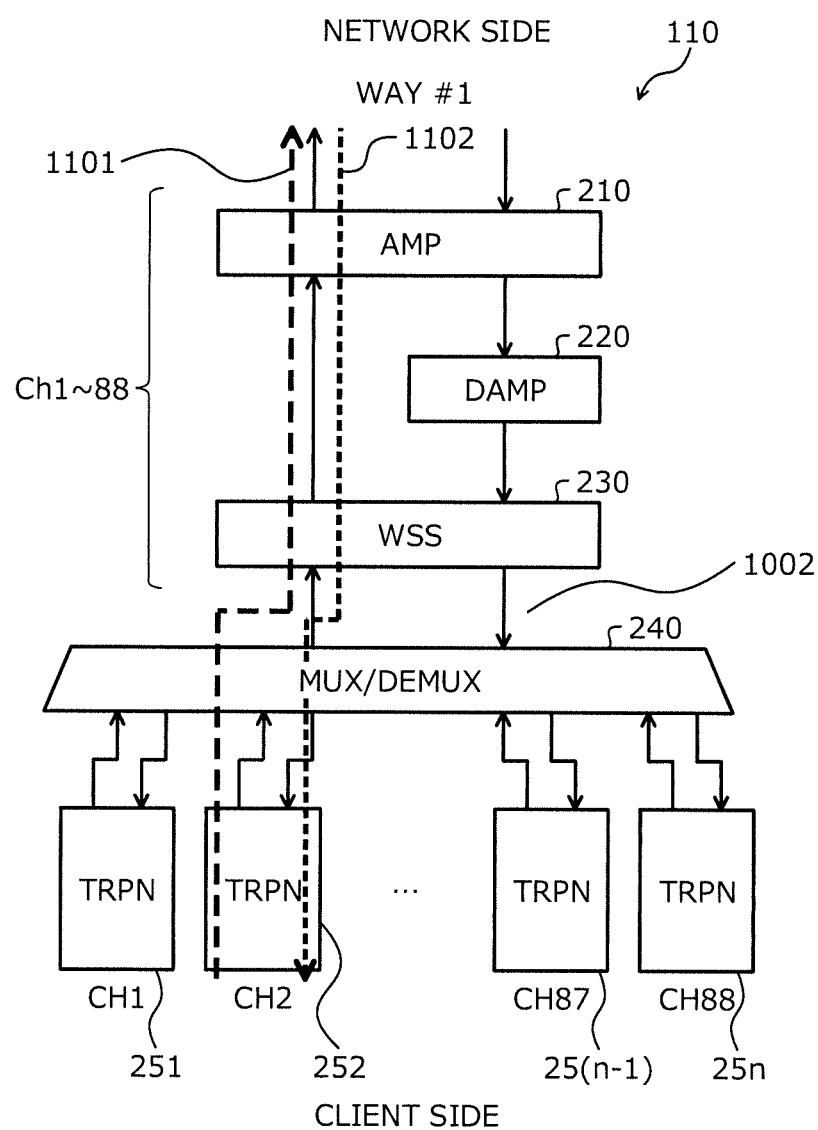
FIG. 11 is a view illustrating an example of a case in which pieces of ADD/DROP information of alarms generated in a WDM transmission system according to the embodiment are different from each other.

FIG. 11 is a view illustrating an example of a case in which pieces of ADD/DROP information of alarms generated in a WDM transmission system according to the embodiment are different from each other. In FIG. 11, like elements to those depicted in FIG. 2 are denoted by the same reference symbols, and overlapping description of them is omitted herein. A path 1101 depicted in FIG. 11 is a path in the ADD direction, and a path 1102 depicted in FIG. 11 is a path in the DROP direction. Accordingly, since an alarm indicative of a failure generated on the path 1101 and an alarm indicative of a failure generated on the path 1102 are different from each other in ADD/DROP information 803, they do not make mask targets of each other in an alarm mask process.

As depicted in FIGS. 9 to 11, by using the way information 801, CH information 802 and ADD/DROP information 803, it is possible to decide whether or not different alarms are generated on the same path.

Figure 12:
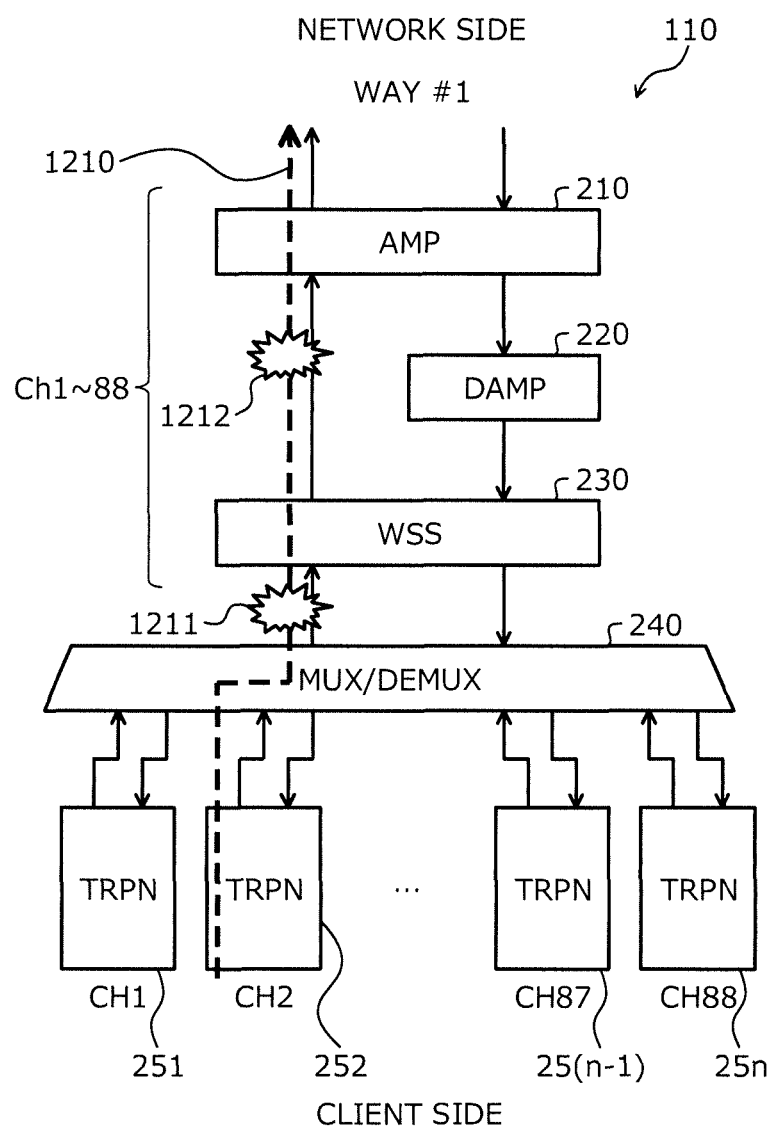
FIG. 12 is a view illustrating an example of an upstream/downstream relationship of alarms generated in a WDM transmission system according to the embodiment.

FIG. 12 is a view illustrating an example of an upstream/downstream relationship of alarms generated in a WDM transmission system according to the embodiment. In FIG. 12, like elements to those depicted in FIG. 2 are denoted by the same reference symbols, and overlapping description of them is omitted herein. A path 1210 depicted in FIG. 12 is a path of the way #1, channel CH2 and ADD direction. Failures 1211 and 1212 are failures both generated on the path 1210.

For example, in the ADD direction of the OADM, a TRPN, a MUX/DEMUX, a WSS and an AMP are coupled in this order. Meanwhile, in the DROP direction of the OADM, an AMP, a DAMP, a WSS, a MUX/DEMUX and a TRPN are coupled in this order. Accordingly, by using information representative of the relationships of them, ADD/DROP information 803 and blade name 804, a relative upstream/downstream relationship of alarms on the path for optical transmission may be decided.

For example, the failure 1211 is a failure generated in a MUX/DEMUX 240, and the failure 1212 is a failure generated in the WSS 230. In this case, both pieces of the ADD/DROP information 803 corresponding to the alarms of the failures 1211 and 1212 indicate the ADD direction; the blade name 804 corresponding to the alarm of the failure 1211 indicates the MUX/DEMUX; and the blade name 804 corresponding to the alarm of the failure 1212 indicates the WSS. Therefore, it may be decided that the alarm of the failure 1212 is an alarm of a failure generated at the downstream on the path for optical transmission with respect to the alarm of the failure 1211.

Figure 13:
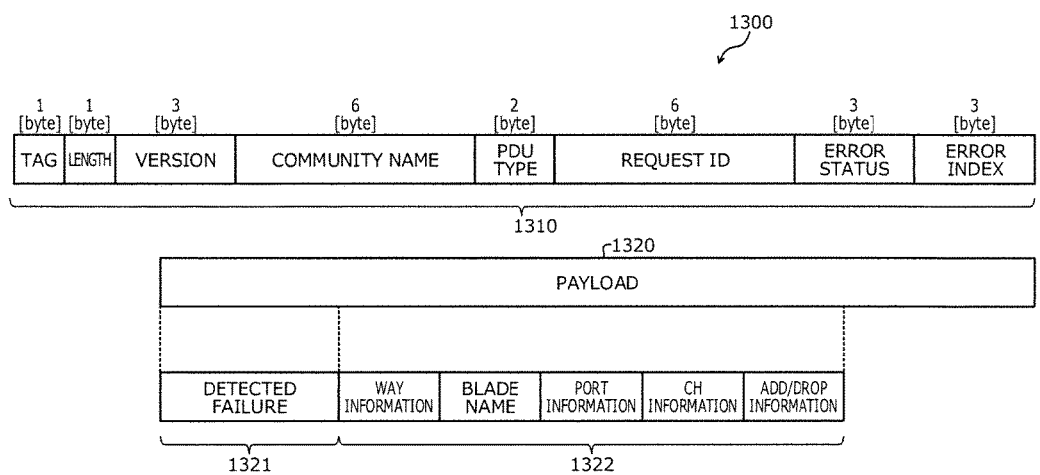
FIG. 13 is a view illustrating an example of alarm information sent by a WDM transmission apparatus according to the embodiment.

FIG. 13 is a view illustrating an example of alarm information sent by a WDM transmission apparatus according to the embodiment. When an alarm is to be sent to a WDM transmission apparatus neighboring at the downstream side of the own apparatus on the path for alarm transfer, the WDM transmission apparatus 111 to 115 that are neighboring apparatus from among the WDM transmission apparatus 111 to 116 send, for example, alarm information 1300 illustrated in FIG. 13.

The alarm information 1300 illustrated in FIG. 13 is a PDU of an SNMP message including a header 1310 and a payload 1320. SNMP is an abbreviation of simple network management protocol. PDU is an abbreviation of protocol data unit. The header 1310 includes a TAG, a length, a version, a community name, a PDU type, a request identification (ID), an error status and an error index.

The TAG of the header 1310 is a tag of 1 byte indicative of a type of the alarm information 1300. The length of the header 1310 is information of 1 byte indicative of a length of the PDU. The version of the header 1310 is information of 3 bytes indicative of a version of the SNMP of the alarm information 1300. The community name of the header 1310 is information of 6 bytes indicative of an identifier for authentication.

The PDU type of the header 1310 is information of 2 bytes indicative of a type of the PDU of the alarm information 1300. The request ID of the header 1310 is information of 6 bytes indicative of a type of a request. The error status of the header 1310 is information of 3 bytes indicative of a situation of an error. The error index of the header 1310 is information of 3 bytes indicative of a type of the error.

The payload 1320 includes an alarm 1321 and alarm additional information 1322. The alarm 1321 is information indicative of a failure detected from hardware. The alarm additional information 1322 is information for allowing each WDM transmission apparatus to carry out an alarm mask process and includes way information, a blade name, port information, CH information and ADD/DROP information.

The way information, blade name, CH information and ADD/DROP information of the alarm additional information 1322 are information corresponding, for example, to the way information 801, blade name 804, CH information 802 and ADD/DROP information 803 illustrated in FIG. 8, respectively. It is to be noted that, since an alarm mask process may be performed even without port information of the alarm additional information 1322, the port information may be omitted from the alarm additional information 1322.

It is to be noted that, if a target alarm is the entire WDM transmission apparatus like an FLT or an SWRESET, since it does not include CH information or port information, the value of, for example, the CH information and the port information may be set to "0." Consequently, a WDM transmission apparatus at the downstream on the path for alarm transfer may decide that the target alarm is not a CH unit or a port unit.

While the foregoing description is given of the alarm information 1300 to be sent from any of the WDM transmission apparatus 111 to 115 that are neighboring apparatus to a different WDM transmission apparatus, the alarm information 1300 may be used also when the WDM transmission apparatus 116 that is an end apparatus sends an alarm to the network management server 130. However, the alarm information 1300 to be sent from the WDM transmission apparatus 116 may include no alarm additional information 1322.

FIG. 14 is a view illustrating an example of an alarm management table stored in a WDM transmission apparatus according to the embodiment. Each WDM transmission apparatus in the WDM transmission system 110 stores, for example, an alarm management table 1400 illustrated in FIG. 14.

The alarm management table 1400 includes, as items, an alarm name, a blade name (blade ID), port information, way information, CH information and ADD/DROP information for each registered alarm. The blade name, way information, CH information and ADD/DROP information of the alarm management table 1400 are alarm additional information, for example, corresponding to the blade name 804, way information 801, CH information 802 and ADD/DROP information 803 illustrated in FIG. 8, respectively.

Each of the WDM transmission apparatus in the WDM transmission system 110 registers an alarm detected by the own apparatus and an alarm received from a different WDM transmission apparatus into the alarm management table 1400. Then, each of the WDM transmission apparatus in the WDM transmission system 110 performs an alarm mask process for masking each of alarms registered in the alarm management table 1400 of the own apparatus in accordance with the alarm mask hierarchy of the own apparatus.

In the example illustrated in FIG. 14, since the alarms corresponding to records 1401 and 1402 of the alarm management table 1400 coincide with each other in terms of the way information, CH information and ADD/DROP information, they may be decided as alarms generated on the same path for optical transmission. Accordingly, each of the alarms is made a mask target in the alarm mask process.

For example, the ADD/DROP information of each of the alarms corresponding to the records 1401 and 1402 indicates the ADD direction, and the blade names of the alarms corresponding to the records 1401 and 1402 indicate the AMP and the WSS, respectively. As described above, on the path in the ADD direction for optical transmission, the AMP is coupled at the downstream with respect to the WSS. Accordingly, in the alarm mask process, an alarm of the AMP corresponding to the record 1401 is masked by an alarm of the WSS corresponding to the record 1402 in accordance with the alarm mask hierarchy.

Although the example illustrated in FIG. 14 is directed to the configuration for registering an alarm name into the alarm management table 1400, the alarm management table 1400 may be configured such that an alarm itself is registered into the alarm management table 1400.

Now, an alarm transfer process in the WDM transmission apparatus 114 to 116 and the network management server 130 is described with reference to FIGS. 15 to 18. In examples depicted in FIGS. 15 to 18, for example, as depicted in FIG. 6, the WDM transmission apparatus 116 is an end apparatus coupled to the network management server 130 through the manager network 120 on the path for alarm transfer. The WDM transmission apparatus 115 is a neighboring apparatus coupled to the upstream of the WDM transmission apparatus 116 on the path for alarm transfer. The WDM transmission apparatus 114 is a neighboring apparatus coupled to the upstream of the WDM transmission apparatus 115 on the path for alarm transfer.

Figure 15:
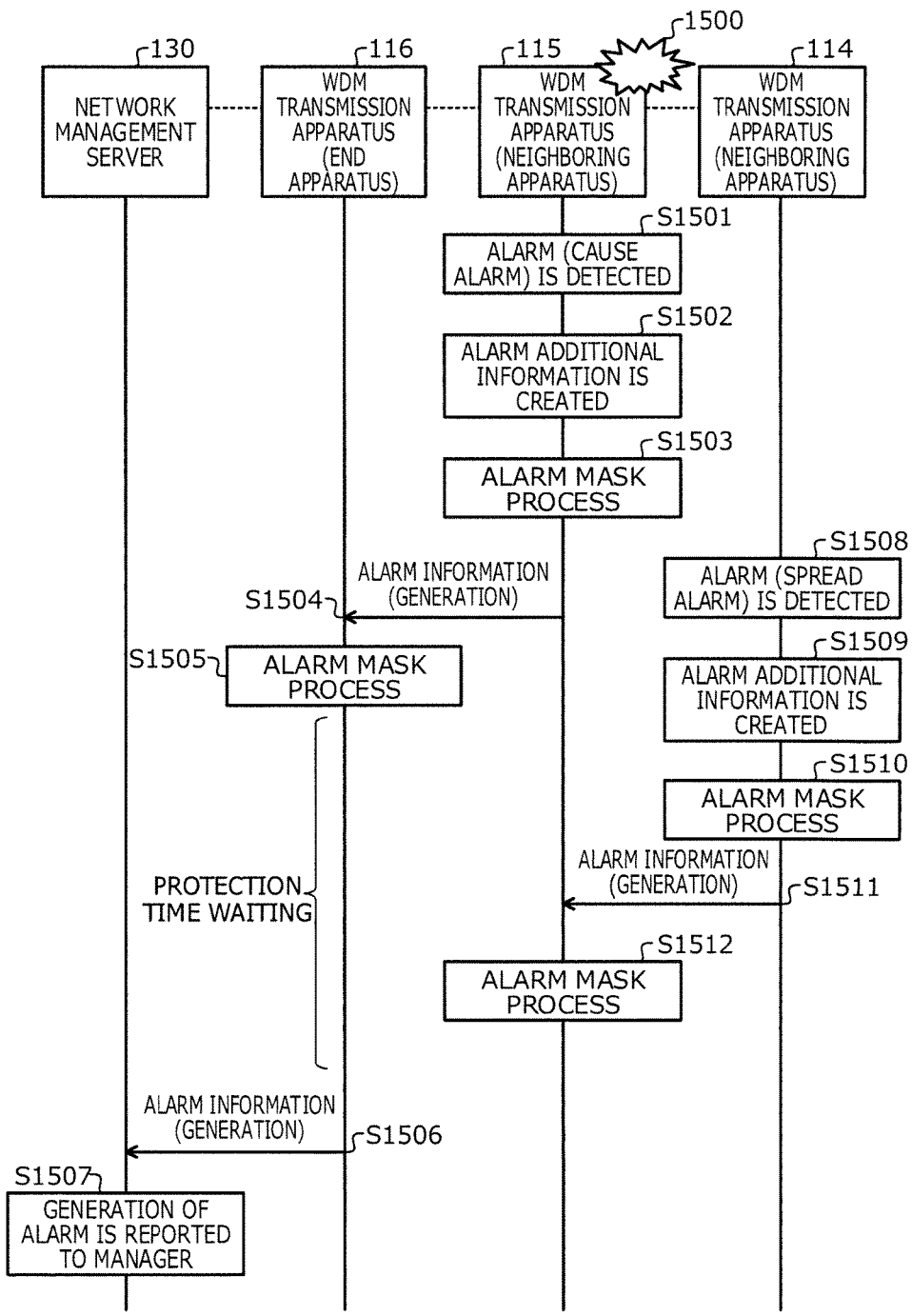
FIG. 15 is a view illustrating a first example of a process in an alarm transfer system according to the embodiment.

FIG. 15 is a view illustrating a first example of a process in an alarm transfer system according to the embodiment. In the alarm transfer system 100 according to the embodiment, for example, each of steps depicted in FIG. 15 is sometimes executed. FIG. 15 illustrates a case in which a malfunction 1500 occurs with the WDM transmission apparatus 115 and an alarm indicative of a failure by the malfunction 1500 is detected first by the WDM transmission apparatus 115.

First, at a timing for alarm collection of the own apparatus, the WDM transmission apparatus 115 detects an alarm indicative of a failure in the WDM transmission apparatus 115 by the malfunction 1500 (step S1501). The alarm detected at step S1501 is a cause alarm because it is an alarm indicative of a failure in the WDM transmission apparatus 115 with which the malfunction 1500 occurs. However, at the point of time of step S1501, that the alarm is a cause alarm is not known to the WDM transmission apparatus 115.

Then, the WDM transmission apparatus 115 creates alarm additional information regarding the alarm detected at step S1501 based on the detection place of the alarm (step S1502). The alarm additional information includes a blade name, a port number, way information, CH information and ADD/DROP information indicative of the detection place of the alarm (for example, refer to FIG. 8). The WDM transmission apparatus 115 registers the alarm additional information created at step S1502 in an associated relationship with the alarm detected at step S1501 into the alarm management table (for example, refer to FIG. 14) of the own apparatus.

Then, the WDM transmission apparatus 115 performs an alarm mask process for masking alarms in the alarm management table of the own apparatus in accordance with the alarm mask hierarchy (for example, refer to FIG. 4) (step S1503). In the alarm mask process at step S1503, the alarm detected at step S1501 is not masked.

Then, since the alarm detected at step S1501 is not masked by the alarm mask process at step S1503, the WDM transmission apparatus 115 sends alarm information for reporting of generation of the alarm to the WDM transmission apparatus 116 (step S1504). The alarm information for reporting of generation of the alarm includes the alarm and the alarm additional information created for the alarm (for example, refer to FIG. 13). The WDM transmission apparatus 116 detects the alarm information sent at step S1504 at a timing for alarm collection of the own apparatus and registers the alarm and the alarm additional information included in the detected alarm information in an associated relationship with each other into the alarm management table of the own apparatus.

Then, the WDM transmission apparatus 116 performs an alarm mask process for masking alarms in the alarm management table of the own apparatus in accordance with the alarm mask hierarchy (step S1505). At step S1505, the alarm indicated by the alarm information sent to the WDM transmission apparatus 116 at step S1504 is not masked.

Then, since the alarm indicated by the alarm information sent to the WDM transmission apparatus 116 at step S1504 is not masked and besides the WDM transmission apparatus 116 itself is an end apparatus, the WDM transmission apparatus 116 performs given protection time waiting from the alarm mask process at step S1505 for the alarm. The given protection time is a period of time in which, for example, another alarm that masks a target alarm may reach the WDM transmission apparatus 116. When the given protection time expires, the WDM transmission apparatus 116 transfers the alarm information sent to the WDM transmission apparatus 116 at step S1504 to the network management server 130 (step S1506).

Then, the network management server 130 reports (for example, displays) the generation of the alarm included in the alarm information transferred at step S1506 to the manager of the alarm transfer system 100 (step S1507). Consequently, the manager of the alarm transfer system 100 may refer to the cause alarm indicative of the failure of the WDM transmission apparatus 115 to specify the malfunction 1500 of the WDM transmission apparatus 115 and may perform a restoration work such as restarting, repair or replacement of the WDM transmission apparatus 115.

Here, it is assumed that, at a timing for alarm collection of the own apparatus, the WDM transmission apparatus 114 detects an alarm indicative of a failure generated in the WDM transmission apparatus 114 arising from the malfunction 1500 (step S1508). Since the alarm detected at step S1508 is an alarm indicative of a failure generated in the WDM transmission apparatus 114 by spreading from the failure of the WDM transmission apparatus 115, it is a spread alarm. However, at the point of time of step S1508, it is not known to the WDM transmission apparatus 114 that the alarm is a spread alarm.

Then, the WDM transmission apparatus 114 creates alarm additional information regarding the alarm detected at step S1508 based on the detection place of the alarm (step S1509). The WDM transmission apparatus 114 registers the alarm additional information created at step S1509 in an associated relationship with the alarm detected at step S1508 into the alarm management table of the own apparatus.

Then, the WDM transmission apparatus 114 performs an alarm mask process for masking alarms in the alarm management table of the own apparatus in accordance with the alarm mask hierarchy (step S1510). In the alarm mask process at step S1510, the alarm detected at step 1508 is not masked.

Then, since the alarm detected at step S1508 is not masked by the alarm mask process at step S1510, the WDM transmission apparatus 114 sends alarm information for reporting of the generation of the alarm to the WDM transmission apparatus 115 (step S1511). At a timing for alarm collection of the own apparatus, the WDM transmission apparatus 115 detects the alarm information sent at step S1511 and registers the alarm and the alarm additional information included in the detected alarm information in an associated relationship with each other into the alarm management table of the own apparatus.

Then, the WDM transmission apparatus 115 performs an alarm mask process for masking alarms in the alarm management table of the own apparatus in accordance with the alarm mask hierarchy (step S1512). At step S1512, the alarm indicated by the alarm information sent to the WDM transmission apparatus 115 at step S1511 is masked based on the alarm detected at step S1501. Consequently, the spread alarm detected at step S1508 is suppressed from being transferred to the WDM transmission apparatus 116 or the network management server 130.

Figure 16:
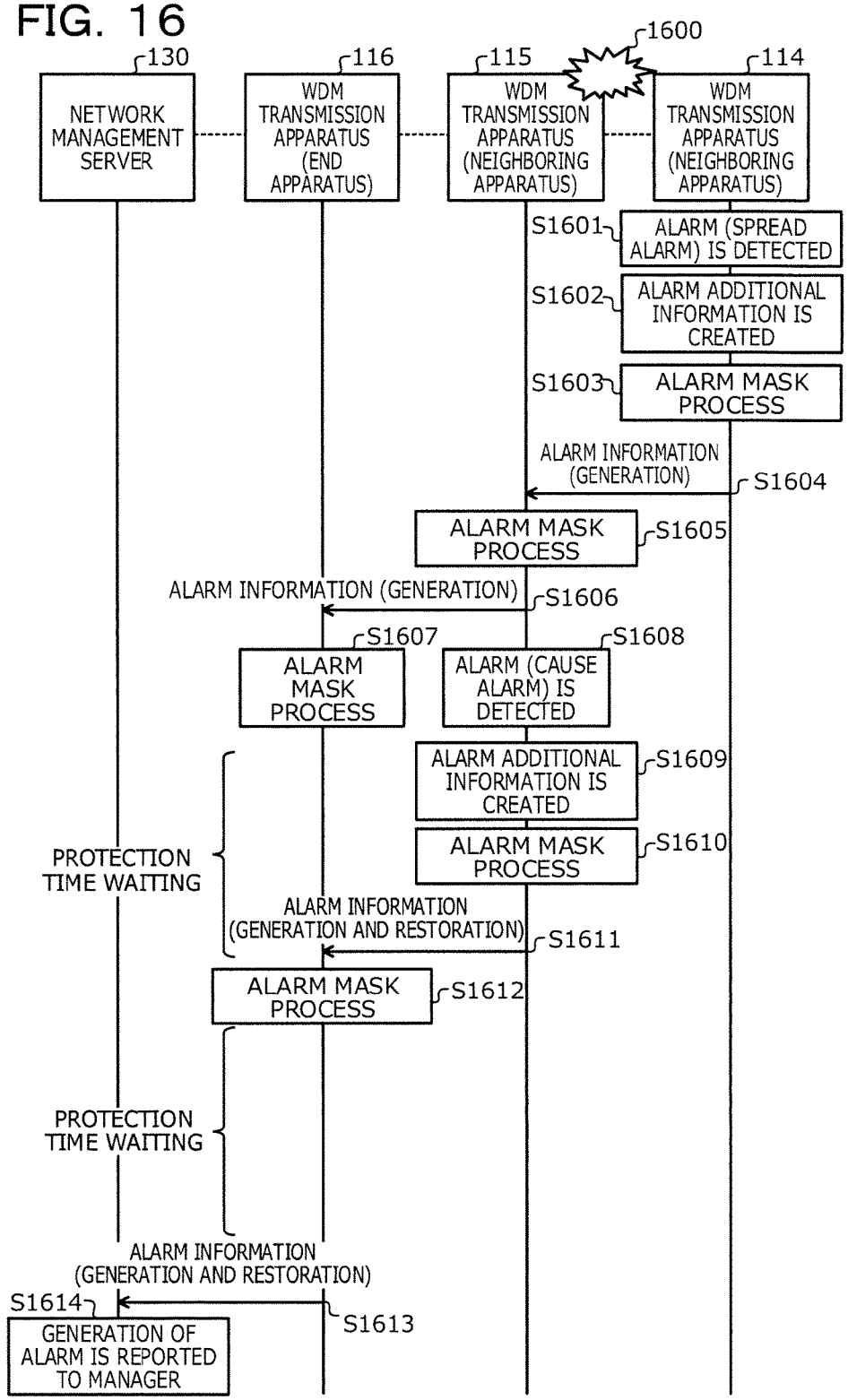
FIG. 16 is a view illustrating a second example of a process in an alarm transfer system according to the embodiment.

FIG. 16 is a view illustrating a second example of a process in an alarm transfer system according to the embodiment. In the alarm transfer system 100 according to the embodiment, for example, each of steps depicted in FIG. 16 is sometimes executed. FIG. 16 illustrates a case in which a malfunction 1600 occurs with the WDM transmission apparatus 115 and an alarm indicative of a failure arising from the malfunction 1600 is detected first by the WDM transmission apparatus 114.

First, at a timing for alarm collection of the own apparatus, the WDM transmission apparatus 114 detects an alarm indicative of a failure of the WDM transmission apparatus 114 arising from the malfunction 1600 (step S1601). Since the alarm detected at step S1601 is an alarm indicative of a failure occurring with the WDM transmission apparatus 114 by spreading from the failure of the WDM transmission apparatus 115, this is a spread alarm. However, at the point of time of step S1601, it is not known to the WDM transmission apparatus 114 that the alarm is a spread alarm.

Then, the WDM transmission apparatus 114 creates alarm additional information regarding the alarm detected at step S1601 based on the detection place of the alarm (step S1602). The WDM transmission apparatus 114 registers the alarm additional information created at step S1602 in an associated relationship with the alarm detected at step S1601 into the alarm management table of the own apparatus.

Then, the WDM transmission apparatus 114 performs an alarm mask process for masking alarms in the alarm management table of the own apparatus in accordance with the alarm mask hierarchy (step S1603). In the alarm mask process at step S1603, the alarm detected at step S1601 is not masked.

Then, since the alarm detected at step S1601 is not masked by the alarm mask process at step S1603, the WDM transmission apparatus 114 sends alarm information for reporting of the generation of the alarm to the WDM transmission apparatus 115 (step S1604). At a timing for alarm collection of the own apparatus, the WDM transmission apparatus 115 detects the alarm information sent at step S1604 and registers the alarm and the alarm additional information included in the detected alarm information in an associated relationship with each other into the alarm management table of the own apparatus.

Then, the WDM transmission apparatus 115 performs an alarm mask process for masking alarms in the alarm management table of the own apparatus in accordance with the alarm mask hierarchy (step S1605). At step S1605, since the cause alarm in the WDM transmission apparatus 115 is not registered in the alarm management table of the WDM transmission apparatus 115, the alarm indicated by the alarm information sent to the WDM transmission apparatus 115 at step S1604 is not masked.

Then, since the alarm sent at step S1604 is not masked by the alarm mask process at step S1605, the WDM transmission apparatus 115 transfers the alarm information for reporting of the generation of the alarm to the WDM transmission apparatus 116 (step S1606). At a timing for alarm collection of the own apparatus, the WDM transmission apparatus 116 detects the alarm information transferred at step S1606 and registers the alarm and the alarm additional information included in the detected alarm information in an associated relationship with each other into the alarm management table of the own apparatus.

Then, the WDM transmission apparatus 116 performs an alarm mask process for masking alarms in the alarm management table of the own apparatus in accordance with the alarm mask hierarchy (step S1607). Since, at step S1607, the cause alarm in the WDM transmission apparatus 115 is not registered in the alarm management table of the WDM transmission apparatus 116, the alarm indicated by the alarm information sent to the WDM transmission apparatus 116 at step S1606 is not masked. Therefore, the WDM transmission apparatus 116 performs protection time waiting for an alarm indicated by the alarm information sent to the WDM transmission apparatus 116 at step S1606.

Here, it is assumed that, next to step S1606, at a timing for alarm collection of the own apparatus, the WDM transmission apparatus 115 detects an alarm indicative of a failure of the WDM transmission apparatus 115 by the malfunction 1600 (step S1608). Since the alarm detected at step S1608 is an alarm indicative of the failure in the WDM transmission apparatus 115 in which the malfunction 1600 is generated, this is a cause alarm.

Then, the WDM transmission apparatus 115 creates alarm additional information regarding the alarm detected at step S1608 based on the detection place of the alarm (step S1609). The WDM transmission apparatus 115 registers the alarm additional information created at step S1609 in an associated relationship with the alarm detected at step S1608 into the alarm management table of the own apparatus.

Then, the WDM transmission apparatus 115 performs an alarm mask process for masking alarms in the alarm management table of the own apparatus in accordance with the alarm mask hierarchy (step S1610). At step S1610, the alarm (spread alarm) sent at step S1604 is masked by the alarm (cause alarm) detected at step S1608.

Then, the WDM transmission apparatus 115 sends alarm information for reporting of the generation of the alarm detected at step S1608 and restoration against the alarm indicated by the alarm information sent at step S1604 to the WDM transmission apparatus 116 (step S1611). The reporting of the restoration against the alarm is a report for requesting suppression of transfer of the alarm. At a timing for alarm collection of the own apparatus, the WDM transmission apparatus 116 detects the alarm information sent at step S1611 and registers, based on the detected alarm information, the alarm whose generation is reported and the alarm additional information for the alarm in an associated relationship with each other into the alarm management table of the own apparatus.

Further, the WDM transmission apparatus 116 masks, based on the detected alarm information, the alarm against which restoration is reported from among the alarms registered in the alarm management table of the own apparatus. In this case, the alarm indicated by the alarm information sent to the WDM transmission apparatus 116 at step S1606 is masked. For example, although the alarm indicated by the alarm information sent to the WDM transmission apparatus 116 at step S1606 is not masked by the alarm mask process at step S1607, it is masked by the alarm indicated by the alarm information at step S1611 within a later protection time.

Thereafter, the WDM transmission apparatus 116 performs an alarm mask process for masking alarms in the alarm management table of the own apparatus in accordance with the alarm mask hierarchy (step S1612). At step S1612, the alarm whose generation is reported by the alarm information sent to the WDM transmission apparatus 116 at step S1611 is not masked.

Then, since the alarm indicated by the alarm information sent to the WDM transmission apparatus 116 at step S1611 is not masked and besides the WDM transmission apparatus 116 itself is an end apparatus, the WDM transmission apparatus 116 performs given protection time waiting from the alarm mask process at step 1612 for the alarm. In the example depicted in FIG. 16, within the protection time, the alarm information for reporting of restoration against the alarm whose generation is reported by the alarm information sent to the WDM transmission apparatus 116 at step S1611 is not sent to the WDM transmission apparatus 116.

Therefore, when the protection time expires, the WDM transmission apparatus 116 transfers the alarm information sent to the WDM transmission apparatus 116 at step S1611 to the network management server 130 (step S1613). It is to be noted that, at step S1613, the WDM transmission apparatus 116 may send the alarm information that does not include the information for reporting of restoration against an alarm to the network management server 130.

Then, the network management server 130 reports (for example, displays) the generation of the alarm whose generation is reported by the alarm information transferred at step S1613 to the manager of the alarm transfer system 100 (step S1614). Consequently, the manager of the alarm transfer system 100 may refer to the cause alarm indicative of the failure of the WDM transmission apparatus 115 to specify the malfunction 1600 of the WDM transmission apparatus 115 and perform a restoration work such as restarting, repair or replacement of the WDM transmission apparatus 115.

Figure 17:
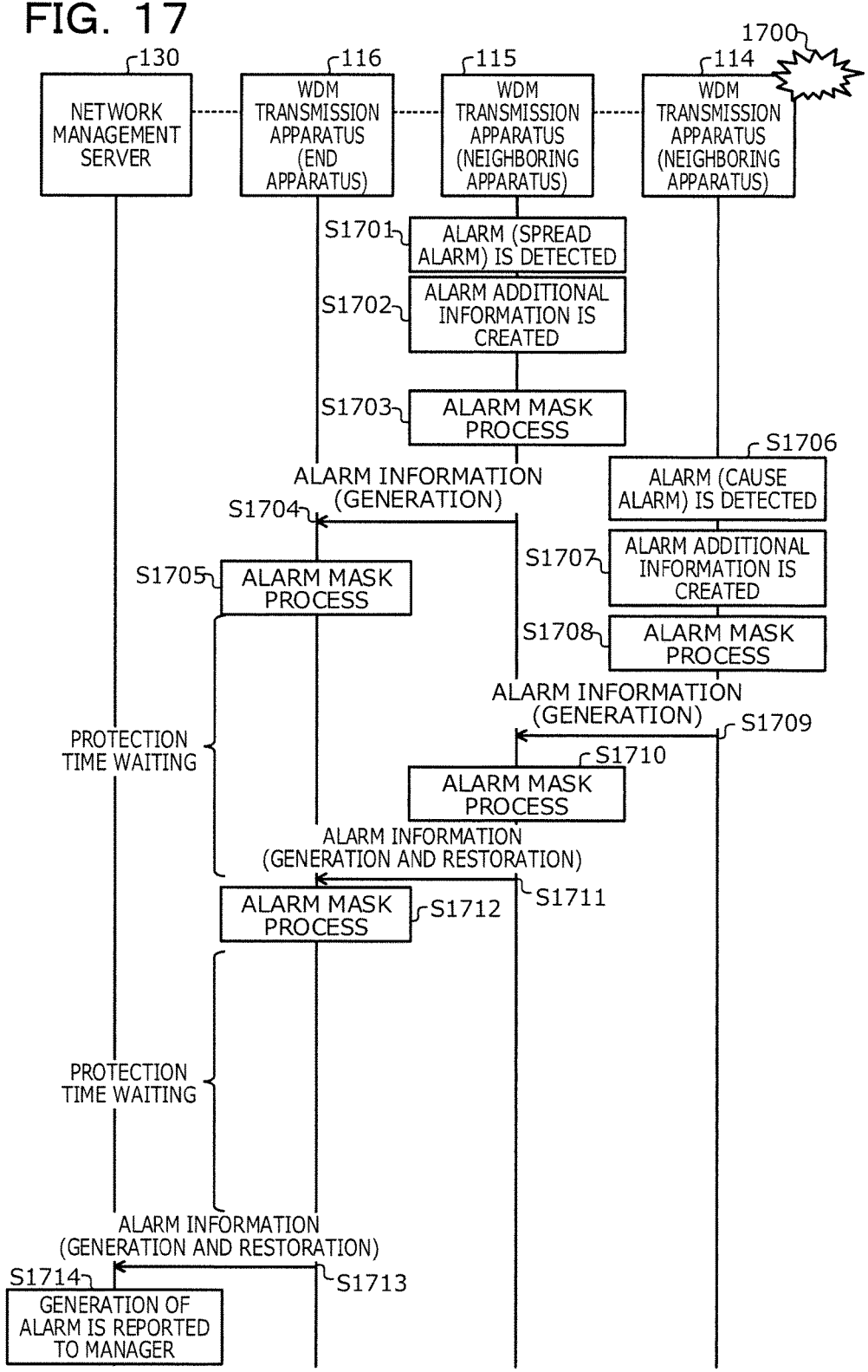
FIG. 17 is a view illustrating a third example of a process in an alarm transfer system according to the embodiment.

FIG. 17 is a view illustrating a third example of a process in an alarm transfer system according to the embodiment. In the alarm transfer system 100 according to the embodiment, for example, each of steps depicted in FIG. 17 is sometimes executed. FIG. 17 illustrates a case in which a malfunction 1700 occurs with the WDM transmission apparatus 114 and an alarm indicative of a failure arising from the malfunction 1700 is detected first by the WDM transmission apparatus 115.

First, at a timing for alarm collection of the own apparatus, the WDM transmission apparatus 115 detects an alarm indicative of a failure in the WDM transmission apparatus 115 arising from the malfunction 1700 (step S1701). Since the alarm detected at step S1701 is an alarm indicative of a failure occurring with the WDM transmission apparatus 115 by spreading from the failure of the WDM transmission apparatus 114, this is a spread alarm. However, at the point of time of step S1701, it is not known to the WDM transmission apparatus 115 that the alarm is a spread alarm.

Then, the WDM transmission apparatus 115 creates alarm additional information regarding the alarm detected at step S1701 based on the detection place of the alarm (step S1702). The WDM transmission apparatus 115 registers the alarm additional information created at step S1702 in an associated relationship with the alarm detected at step S1701 into the alarm management table of the own apparatus.

Then, the WDM transmission apparatus 115 performs an alarm mask process for masking alarms in the alarm management table of the own apparatus in accordance with the alarm mask hierarchy (step S1703). In the alarm mask process at step S1703, the alarm detected at step S1701 is not masked.

Then, since the alarm detected at step S1701 is not masked by the alarm mask process at step S1703, the WDM transmission apparatus 115 sends alarm information for reporting of the generation of the alarm to the WDM transmission apparatus 116 (step S1704). At a timing for alarm collection of the own apparatus, the WDM transmission apparatus 116 detects the alarm information sent at step S1704 and registers the alarm and the alarm additional information included in the detected alarm information in an associated relationship with each other into the alarm management table of the own apparatus.

Then, the WDM transmission apparatus 116 performs an alarm mask process for masking alarms in the alarm management table of the own apparatus in accordance with the alarm mask hierarchy (step S1705). At step S1705, since the cause alarm in the WDM transmission apparatus 114 is not registered in the alarm management table of the WDM transmission apparatus 116, the alarm indicated by the alarm information sent to the WDM transmission apparatus 116 at step S1704 is not masked. Therefore, the WDM transmission apparatus 116 performs protection time waiting for an alarm indicated by the alarm information sent to the WDM transmission apparatus 116 at step S1704.

Here, it is assumed that the WDM transmission apparatus 114 detects an alarm indicative of a failure in the WDM transmission apparatus 114 by the malfunction 1700 at a timing for alarm collection of the own apparatus (step S1706). Since the alarm detected at step S1706 is an alarm indicative of the failure of the WDM transmission apparatus 114 with which the malfunction 1700 occurs, this is a cause alarm. However, at the point of time of step S1706, it is not known to the WDM transmission apparatus 114 that the alarm is a cause alarm.

Then, the WDM transmission apparatus 114 creates alarm additional information regarding the alarm detected at step S1706 based on the detection place of the alarm (step S1707). The WDM transmission apparatus 114 registers the alarm additional information created at step S1707 in an associated relationship with the alarm detected at step S1706 into the alarm management table of the own apparatus.

Then, the WDM transmission apparatus 114 performs an alarm mask process for masking alarms in the alarm management table of the own apparatus in accordance with the alarm mask hierarchy (step S1708). In the alarm mask process at step S1708, the alarm detected at step S1706 is not masked.

Then, since the alarm detected at step S1706 is not masked by the alarm mask process at step S1708, the WDM transmission apparatus 114 sends alarm information for reporting of the generation of the alarm to the WDM transmission apparatus 115 (step S1709). At a timing for alarm collection of the own apparatus, the WDM transmission apparatus 115 detects the alarm information sent at step S1709 and registers the alarm and the alarm additional information included in the detected alarm information in an associated relationship with each other into the alarm management table of the own apparatus.

Then, the WDM transmission apparatus 115 performs an alarm mask process for masking alarms in the alarm management table of the own apparatus in accordance with the alarm mask hierarchy (step S1710). At step S1710, the alarm (spread alarm) detected at step S1701 is masked by the alarm (cause alarm) sent at step S1709.

Then, the WDM transmission apparatus 115 sends alarm information for reporting of the generation of the alarm indicated by the alarm information sent at step S1709 and the restoration against the alarm detected at step S1701 to the WDM transmission apparatus 116 (step S1711). At a timing for alarm collection of the own apparatus, the WDM transmission apparatus 116 detects the alarm information sent at step S1711 and registers the alarm whose generation is reported and the alarm additional information for the alarm in an associated relationship with each other into the alarm management table of the own apparatus.

Further, the WDM transmission apparatus 116 masks, based on the detected alarm information, the alarm against which restoration is reported from among the alarms registered in the alarm management table of the own apparatus. In this case, the alarm indicated by the alarm information sent to the WDM transmission apparatus 116 at step S1704 is masked. For example, although the alarm indicated by the alarm information sent to the WDM transmission apparatus 116 at step S1704 is not masked by the alarm mask process at step S1705, it is masked by the alarm indicated by the alarm information at step S1711 within a later protection time.

Then, the WDM transmission apparatus 116 performs an alarm mask process for masking alarms in the alarm management table of the own apparatus in accordance with the alarm mask hierarchy (step S1712). At step S1712, the alarm indicated by the alarm information sent to the WDM transmission apparatus 116 at step S1711 is not masked.

Then, since the alarm indicated by the alarm information sent to the WDM transmission apparatus 116 at step S1711 is not masked and besides the WDM transmission apparatus 116 itself is an end apparatus, the WDM transmission apparatus 116 performs given protection time waiting from the alarm mask process at step S1712 for the alarm. In the example illustrated in FIG. 17, the alarm information for reporting of restoration against the alarm is not sent to the WDM transmission apparatus 116 within the protection time.

Therefore, when the protection time expires, the WDM transmission apparatus 116 transfers the alarm information sent to the WDM transmission apparatus 116 at step S1711 to the network management server 130 (step S1713). It is to be noted that, at step S1713, the WDM transmission apparatus 116 may send the alarm information that does not include the information for reporting of restoration against an alarm to the network management server 130.

Then, the network management server 130 reports the generation of the alarm whose generation is reported by the alarm information transferred at step S1713 to the manager of the alarm transfer system 100 (step S1714). Consequently, the manager of the alarm transfer system 100 may refer to the cause alarm indicative of the failure of the WDM transmission apparatus 114 to specify the malfunction 1700 of the WDM transmission apparatus 114 and perform a restoration work such as restarting, repair or replacement of the WDM transmission apparatus 114.

Figure 18:
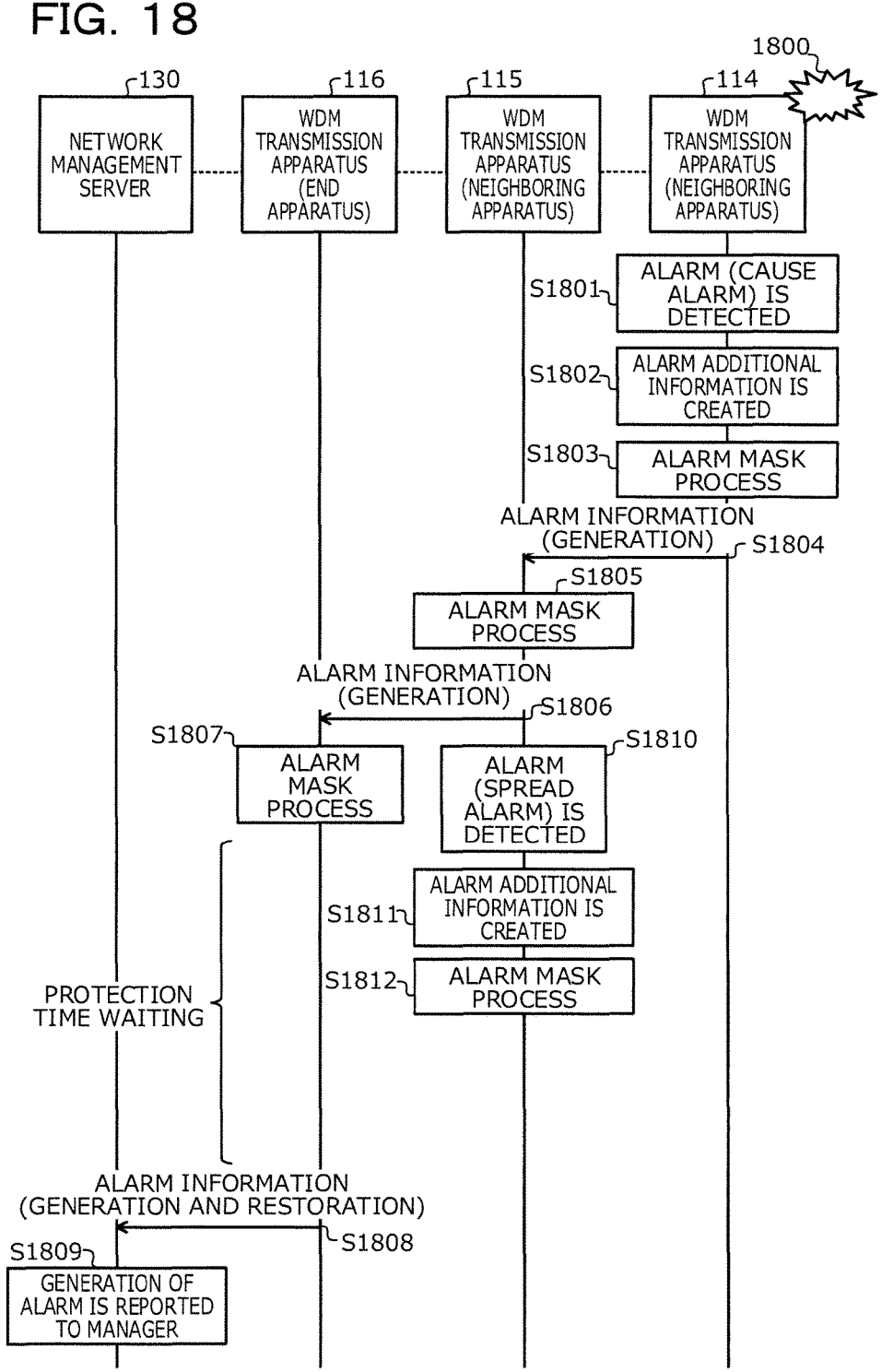
FIG. 18 is a view illustrating a fourth example of a process in an alarm transfer system according to the embodiment.

FIG. 18 is a view illustrating a fourth example of a process in an alarm transfer system according to the embodiment. In the alarm transfer system 100 according to the embodiment, for example, each of steps depicted in FIG. 18 is sometimes executed. FIG. 18 illustrates a case in which a malfunction 1800 occurs with the WDM transmission apparatus 114 and an alarm indicative of a failure by the malfunction 1800 is detected first by the WDM transmission apparatus 114.

First, at a timing for alarm collection of the own apparatus, the WDM transmission apparatus 114 detects an alarm indicative of a failure in the WDM transmission apparatus 114 by the malfunction 1800 (step S1801). The alarm detected at step S1801 is a cause alarm because it is an alarm indicative of a failure in the WDM transmission apparatus 114 with which the malfunction 1800 occurs. However, at the point of time of step S1801, that the alarm is a cause alarm is not known to the WDM transmission apparatus 114.

Then, the WDM transmission apparatus 114 creates alarm additional information regarding the alarm detected at step S1801 based on the detection place of the alarm (step S1802). The WDM transmission apparatus 114 registers the alarm additional information created at step S1802 in an associated relationship with the alarm detected at step S1801 into the alarm management table of the own apparatus.

Then, the WDM transmission apparatus 114 performs an alarm mask process for masking alarms in the alarm management table of the own apparatus in accordance with the alarm mask hierarchy (step S1803). In the alarm mask process at step S1803, the alarm detected at step S1801 is not masked.

Then, since the alarm detected at step S1801 is not masked by the alarm mask process at step S1803, the WDM transmission apparatus 114 sends alarm information for reporting of the generation of the alarm to the WDM transmission apparatus 115 (step S1804). At a timing for alarm collection of the own apparatus, the WDM transmission apparatus 115 detects the alarm information sent at step S1804 and registers the alarm and the alarm additional information included in the detected alarm information in an associated relationship with each other into the alarm management table of the own apparatus.

Then, the WDM transmission apparatus 115 performs an alarm mask process for masking alarms in the alarm management table of the own apparatus in accordance with the alarm mask hierarchy (step S1805). In the alarm mask process at step S1805, the alarm indicated by the alarm information sent to the WDM transmission apparatus 115 at step S1804 is not masked.

Then, since the alarm indicated by the alarm information sent at step S1804 is not masked by the alarm mask process at step S1805, the WDM transmission apparatus 115 transfers the alarm information to the WDM transmission apparatus 116 (step S1806). At a timing for alarm collection of the own apparatus, the WDM transmission apparatus 116 detects the alarm information sent at step S1806 and registers the alarm and the alarm additional information included in the detected alarm information in an associated relationship with each other into the alarm management table of the own apparatus.

Then, the WDM transmission apparatus 116 performs an alarm mask process for masking alarms in the alarm management table of the own apparatus in accordance with the alarm mask hierarchy (step S1807). At step S1807, the alarm indicated by the alarm information sent to the WDM transmission apparatus 116 at step S1806 is not masked.

Then, since the alarm indicted by the alarm information sent to the WDM transmission apparatus 116 at step S1806 is not masked and besides the WDM transmission apparatus 116 itself is an end apparatus, the WDM transmission apparatus 116 performs given protection time waiting from the alarm mask process at step S1807 for the alarm. In the example depicted in FIG. 18, within the protection time, the alarm information for reporting of restoration against the alarm whose generation is reported by the alarm information sent to the WDM transmission apparatus 116 at step S1806 is not sent to the WDM transmission apparatus 116.

Therefore, when the given protection time expires, the WDM transmission apparatus 116 transfers the alarm information sent to the WDM transmission apparatus 116 at step S1806 to the network management server 130 (step S1808). It is to be noted that, at step S1808, the WDM transmission apparatus 116 may send the alarm information from which the information for reporting of restoration against an alarm is removed to the network management server 130.

Then, the network management server 130 reports (for example, displays) the generation of the alarm included in the alarm information transferred at step S1808 to the manager of the alarm transfer system 100 (step S1809). Consequently, the manager of the alarm transfer system 100 may refer to the cause alarm indicative of the failure of the WDM transmission apparatus 114 to specify the malfunction 1800 of the WDM transmission apparatus 114 and may perform a restoration work such as restarting, repair, or replacement of the WDM transmission apparatus 114.

Further, it is assumed that, next to step S1806, at a timing for alarm collection of the own apparatus, the WDM transmission apparatus 115 detects an alarm indicative of a failure occurring with the WDM transmission apparatus 115 arising from the malfunction 1800 (step S1810). Since the alarm detected at step S1810 is an alarm indicative of a failure occurring with the WDM transmission apparatus 115 by spreading from the failure of the WDM transmission apparatus 114, this is a spread alarm. However, at the point of time at step S1810, that the alarm is a spread alarm is not known to the WDM transmission apparatus 115.

Then, the WDM transmission apparatus 115 creates alarm additional information regarding the alarm detected at step S1810 based on the detection place of the alarm (step S1811). The WDM transmission apparatus 115 registers the alarm additional information created at step S1811 in associated relationship with the alarm detected at step S1810 into the alarm management table of the own apparatus.

Then, the WDM transmission apparatus 115 performs an alarm mask process for masking alarms in the alarm management table of the own apparatus in accordance with the alarm mask hierarchy (step S1812). At step S1812, the alarm detected at step S1810 is masked by the alarm indicated by the alarm information sent at step S1804. Consequently, the spread alarm detected at step S1810 may be suppressed from being transferred to the WDM transmission apparatus 116 or the network management server 130.

Figure 19:
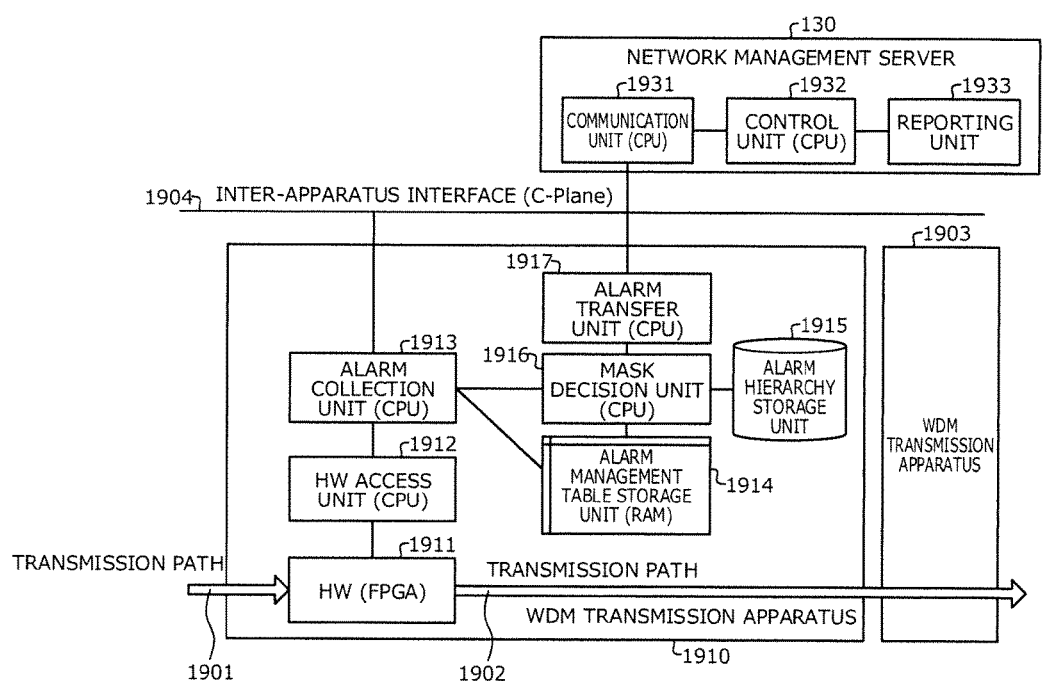
FIG. 19 is a view depicting an example of a WDM transmission apparatus and a network management server according to the embodiment.

FIG. 19 is a view depicting an example of a WDM transmission apparatus and a network management server according to the embodiment. Each of the WDM transmission apparatus (for example, the WDM transmission apparatus 111 to 116) in the WDM transmission system 110 may be implemented, for example, by a WDM transmission apparatus 1910 depicted in FIG. 19.

The WDM transmission apparatus 1910 includes an HW 1911, an HW access unit 1912, an alarm collection unit 1913, an alarm management table storage unit 1914, a mask decision unit 1916, an alarm hierarchy storage unit 1915 and an alarm transfer unit 1917.

The HW 1911 is a piece of hardware that implements a function for optical transmission in the WDM transmission apparatus 1910. The HW 1911 is an optical circuit that implements, for example, at least one of the AMP, DAMP, WSS, MUX/DEMUX and TRPN described hereinabove. The HW 1911 may be implemented, as an example, by a field programmable gate array (FPGA) or the like. A configuration of the HW 1911 according to an optical transmission function of the WDM transmission apparatus 1910 is hereinafter described (for example, refer to FIGS. 24 to 26).

The HW 1911 performs an optical process for an optical signal sent through a transmission path 1901 from a WDM transmission apparatus at the upstream of the WDM transmission apparatus 1910 on a path for optical transmission. Then, the HW 1911 sends the optical signal for which the optical process is performed through a transmission path 1902 to a WDM transmission apparatus 1903 at the downstream of the WDM transmission apparatus 1910 on the path for optical transmission. For example, if the WDM transmission apparatus 1910 is the AMP described hereinabove, the HW 1911 amplifies an optical signal sent from a WDM transmission apparatus at the upstream through the transmission path 1901 and sends the amplified optical signal to the WDM transmission apparatus 1903 at the downstream through the transmission path 1902.

Further, the HW 1911 monitors, for example, a state of an optical signal inputted from the transmission path 1901 and a state of an optical signal outputted from the transmission path 1902 and stores information representative of a result of the monitoring into a register of the HW 1911. The information representative of a result of the monitoring includes an alarm indicative of occurrence of a failure. The failure indicated by the alarm includes a failure by a malfunction of the HW 1911 and a failure that is caused by spreading from a failure at the upstream of the WDM transmission apparatus 1910 on the path for optical transmission.

The HW access unit 1912 performs accessing to the register of the HW 1911. The HW access unit 1912 may be implemented, as an example, by a central processing unit (CPU).

The alarm collection unit 1913 performs, at a timing for alarm collection of a given period (as an example, in a period of 500 milliseconds), collection of an alarm by reading out of the register of the HW 1911 through the HW access unit 1912. Then, if an alarm is detected from the register of the HW 1911, the alarm collection unit 1913 registers the detected alarm and alarm additional information created based on the detection place of the alarm in an associated relationship with each other into the alarm management table of the alarm management table storage unit 1914.

Further, at a timing for alarm collection, the alarm collection unit 1913 collects alarm information sent from a neighboring WDM transmission apparatus at the upstream side of the WDM transmission apparatus 1910 on the path for alarm transfer through an inter-apparatus interface 1904. Then, if alarm information is detected, the alarm collection unit 1913 registers the alarm and the alarm additional information included in the detected alarm information in an associated relationship with each other into the alarm management table of the alarm management table storage unit 1914.

Further, if the alarm collection unit 1913 changes the substance of the alarm management table of the alarm management table storage unit 1914, it reports to the mask decision unit 1916 that the substance of the alarm management table of the alarm management table storage unit 1914 is changed. The alarm collection unit 1913 may be implemented, as an example, by a CPU.

The alarm management table storage unit 1914 stores the alarm management table described hereinabove (for example, refer to FIG. 14). The alarm management table stored in the alarm management table storage unit 1914 is updated by the alarm collection unit 1913. The alarm management table storage unit 1914 may be implemented, as an example, by a random access memory (RAM).

The alarm hierarchy storage unit 1915 stores the alarm mask hierarchy described hereinabove (for example, refer to FIG. 4). In the alarm hierarchy storage unit 1915, for example, the alarm mask hierarchy may be stored in advance, or an alarm mask hierarchy inputted from the outside may be stored. The alarm hierarchy storage unit 1915 may be implemented, for example, by a RAM or a read only memory (ROM).

If that the substance of the alarm management table of the alarm management table storage unit 1914 is changed is reported from the alarm collection unit 1913, the mask decision unit 1916 performs an alarm mask process of alarms in the alarm management table of the alarm management table storage unit 1914. Further, the mask decision unit 1916 performs an alarm mask process in accordance with the alarm mask hierarchy stored in the alarm hierarchy storage unit 1915. For example, the mask decision unit 1916 maps the information registered in the alarm management table to the alarm mask hierarchy and decides a hierarchical relationship of the alarms to perform an alarm mask process.

Then, if there remains an alarm that is not masked and besides is not transferred to a transfer destination of the WDM transmission apparatus 1910 after the alarm mask process, the mask decision unit 1916 outputs alarm information including the alarm and alarm additional information of the alarm to the alarm transfer unit 1917. Further, if an alarm of alarm information outputted already to the alarm transfer unit 1917 is masked by an alarm mask process, the mask decision unit 1916 reports to the alarm transfer unit 1917 that the alarm is masked. The mask decision unit 1916 may be implemented, as an example, by a CPU.

The alarm transfer unit 1917 sends alarm information outputted from the mask decision unit 1916 to a transfer destination of the WDM transmission apparatus 1910 on the path for alarm transfer through the inter-apparatus interface 1904. For example, if the WDM transmission apparatus 1910 is a neighboring apparatus described above, the alarm transfer unit 1917 sends the alarm information to a WDM transmission apparatus neighboring at the downstream side of the WDM transmission apparatus 1910 on the path for alarm transfer.

On the other hand, if the WDM transmission apparatus 1910 is an end apparatus described above, the alarm transfer unit 1917 sends the alarm information to the network management server 130 through the manager network 120. In this case, the alarm transfer unit 1917 waits for a given protection time before it sends the alarm information to the network management server 130.

Then, if that the alarm of the alarm information is masked is reported during a protection time from the mask decision unit 1916, the alarm transfer unit 1917 discards the alarm information without sending the same to the network management server 130. Further, even if the protection time expires, if that the alarm of the alarm information is masked is not reported from the mask decision unit 1916, the alarm transfer unit 1917 sends the alarm information to the network management server 130. In this manner, where the WDM transmission apparatus 1910 is an end apparatus, fluttering of an alarm or the like may be suppressed by providing a protection time for sending of alarm information to the network management server 130.

The protection time is a period of time in which, for example, another alarm that masks a target alarm may reach the WDM transmission apparatus 1910 (end apparatus). For example, the protection time may be set arbitrarily, for example, in response to the target alarm. Further, the protection time may be set, for example, in response to the number of WDM transmission apparatus in the WDM transmission system 110.

As an example, if it is assumed that the period in which an alarm is collected in each WDM transmission apparatus is 500 milliseconds, the protection time [second] of an alarm may be calculated by {(total WDM transmission apparatus number)−(WDM transmission apparatus number from alarm generation apparatus to end apparatus)}×0.5+α. The (total WDM transmission apparatus number) is the total number of WDM transmission apparatus on the path for alarm transfer of the WDM transmission system 110. The (WDM transmission apparatus number from alarm generation apparatus to end apparatus) is the total number of WDM transmission apparatus from the WDM transmission apparatus from which the target alarm is generated to the end apparatus. α is a margin with an error of the transmission time and so forth taken into consideration. For example, the protection time of an alarm generated in the WDM transmission apparatus 113 in the WDM transmission system 110 depicted in FIG. 6 may be determined as $\{6-4\} \times 0.5 + \alpha = 1 + \alpha$ [seconds].

Alternatively, the protection time may not be provided such that the alarm transfer unit 1917 sends alarm information outputted from the mask decision unit 1916 immediately to the network management server 130.

As depicted in FIG. 19, the network management server 130 includes a communication unit 1931, a control unit 1932 and a reporting unit 1933. The communication unit 1931 receives alarm information sent from the WDM transmission apparatus 1910 (end apparatus) through the manager network 120. Then, the communication unit 1931 outputs the received alarm information to the control unit 1932 in response to a request from the control unit 1932.

The control unit 1932 issues a request for alarm information to the communication unit 1931 and outputs alarm information outputted from the communication unit 1931 to the reporting unit 1933. The reporting unit 1933 reports the substance of the alarm information outputted from the control unit 1932 to the manager of the alarm transfer system 100. The report from the reporting unit 1933 may be any of various reports such as a display by an image or a report by voice.

In the WDM transmission apparatus 1910 depicted in FIG. 19, a reception unit which receives an alarm from a second transmission apparatus different from the own apparatus from among the WDM transmission apparatus of the WDM transmission system 110, may be implemented, for example, by the alarm collection unit 1913. Meanwhile, a detection unit in the WDM transmission apparatus 1910, which detects an alarm generated in the own apparatus, may be implemented, for example, by the HW access unit 1912 and the alarm collection unit 1913.

Further, a processing unit in the WDM transmission apparatus 1910, which performs a mask process of alarms including an alarm received by the reception unit and an alarm detected by the detection unit, may be implemented, for example, by the mask decision unit 1916. Further, a sending unit in the WDM transmission apparatus 1910, which sends an alarm not masked by the mask process to a third transmission apparatus or a given apparatus (network management server 130), may be implemented, for example, by the alarm transfer unit 1917.

Figure 20:
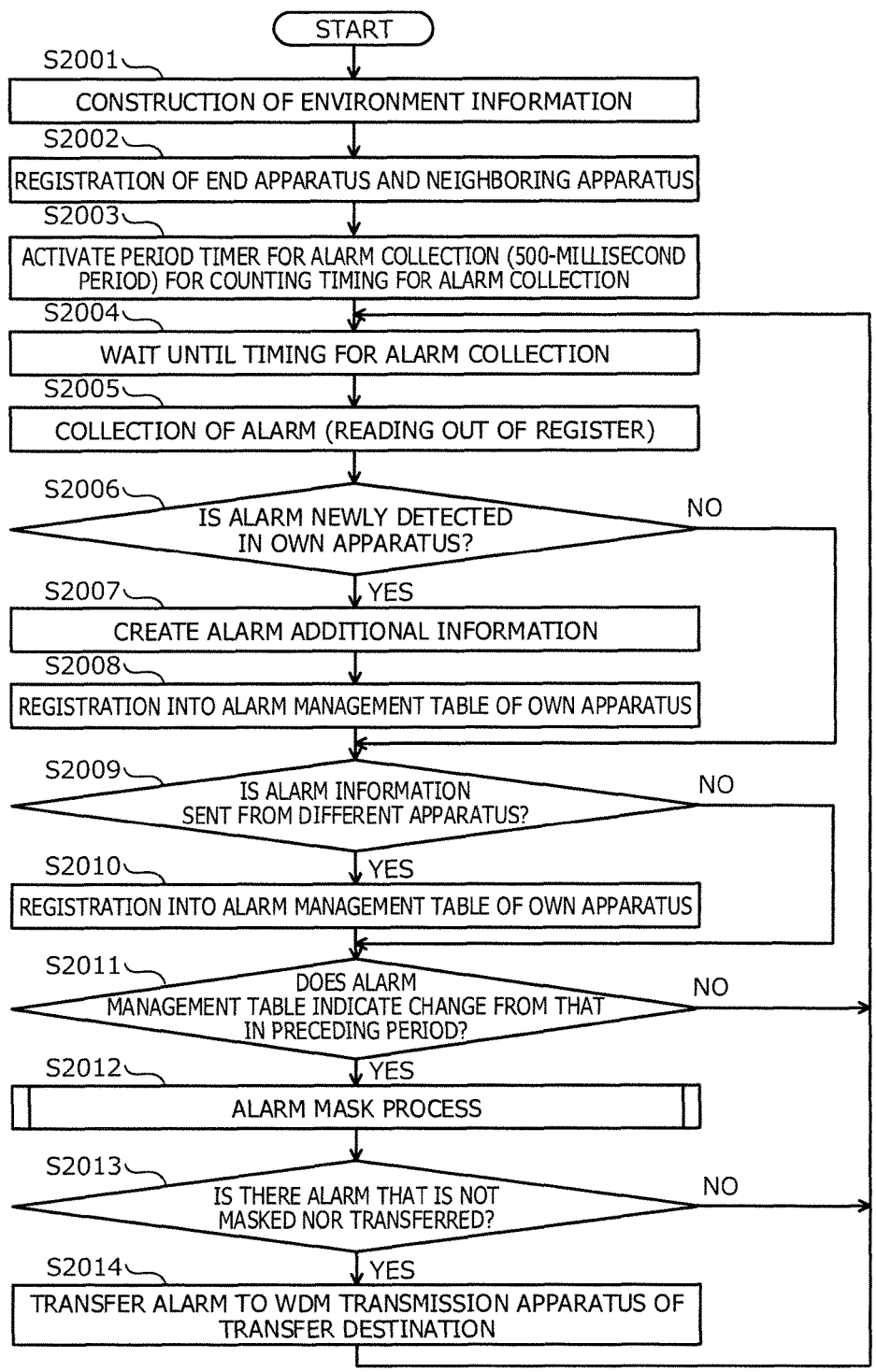
FIG. 20 is a flow chart illustrating an example of a process by a WDM transmission apparatus (neighboring apparatus) according to the embodiment.

FIG. 20 is a flow chart illustrating an example of a process by a WDM transmission apparatus (neighboring apparatus) according to the embodiment. Where the WDM transmission apparatus 1910 depicted in FIG. 19 is provided as a neighboring apparatus, it executes, for example, each of steps depicted in FIG. 20.

First, the WDM transmission apparatus 1910 performs construction (system construction) of environment information of each of the WDM transmission apparatus (WDM blade), ways, CHs and so forth used in the WDM transmission system 110 (step S2001). The process at step S2001 is performed by an operation, for example, from the manager of the alarm transfer system 100.

Then, the WDM transmission apparatus 1910 performs registration of an end apparatus and neighboring apparatus from among the WDM transmission apparatus used in the WDM transmission system 110 (step S2002). The process at step S2002 is performed by an operation, for example, from the manager of the alarm transfer system 100. At step S2002, the WDM transmission apparatus 1910 registers, for example, an Internet protocol (IP) address of a WDM transmission apparatus neighboring at the downstream side of the own apparatus on the path for alarm transfer as an address for transfer destination of an alarm from the own apparatus. Further, the WDM transmission apparatus 1910 initializes the alarm management table of the own apparatus.

Then, the WDM transmission apparatus 1910 activates a period timer for alarm collection for counting a timing for alarm collection of a period of 500 milliseconds for collecting an alarm (step S2003). Then, the WDM transmission apparatus 1910 waits until the timing for alarm collection based on the period timer for alarm collection activated at step S2003 (step S2004).

If the timing for alarm collection comes at step S2004, the WDM transmission apparatus 1910 collects an alarm by performing reading out of the register of the HW 1911 of the own apparatus (step S2005). Then, the WDM transmission apparatus 1910 decides whether or not an alarm is newly detected in the own apparatus at step S2005 (step S2006).

If it is decided that an alarm is not newly detected in the own apparatus at step S2006 (step S2006: No), the WDM transmission apparatus 1910 advances the processing to step S2009. If it is decided that an alarm is newly detected in the own apparatus (step S2006: Yes), the WDM transmission apparatus 1910 creates alarm additional information (for example, refer to FIG. 8) regarding the alarm detected at step S2005 based on the detection place of the alarm (step S2007).

Then, the WDM transmission apparatus 1910 registers the alarm additional information created at step S2007 in an associated relationship with the alarm detected at step S2005 into the alarm management table (refer to FIG. 14) of the own apparatus (step S2008).

Then, the WDM transmission apparatus 1910 decides whether or not alarm information is sent from a different apparatus (step S2009). This different apparatus is, for example, a WDM transmission apparatus neighboring at the upstream side of the own apparatus on the path for alarm transfer from among the WDM transmission apparatus of the WDM transmission system 110.

If alarm information is not sent from the different apparatus at step S2009 (step S2009: No), the WDM transmission apparatus 1910 advances the processing to step S2011. If alarm information is sent from the different apparatus (step S2009: Yes), the WDM transmission apparatus 1910 registers the alarm and the alarm additional information for the alarm included in the alarm information sent from the different apparatus into the alarm management table of the own apparatus (step S2010).

Then, the WDM transmission apparatus 1910 decides whether or not the alarm management table of the own apparatus indicates a change from that one period before the timing for alarm collection (step S2011). For example, the WDM transmission apparatus 1910 decides whether or not an alarm is registered into the alarm management table of the own apparatus at least at one of the immediately preceding steps S2008 and S2010.

If the alarm management table does not indicate a change at step S2011 (step S2011: No), the WDM transmission apparatus 1910 returns the processing to step S2004. If the alarm management table indicates a change (step S2011: Yes), the WDM transmission apparatus 1910 performs an alarm mask process for masking alarms in the alarm management table of the own apparatus in accordance with the alarm mask hierarchy (step S2012). The alarm mask process at step S2012 is hereinafter described (for example, refer to FIG. 21).

Then, the WDM transmission apparatus 1910 decides based on a result of the alarm mask process at step S2012 whether or not the alarm management table of the own apparatus includes an alarm that is not masked nor transferred to the transfer destination (alarm whose transfer is desirable) (step S2013).

If it is decided at step S2013 that the alarm management table of the own apparatus does not include an alarm that is not masked nor transferred (step S2013: No), the WDM transmission apparatus 1910 returns the processing to step S2004. If it is decided that the alarm management table of the own apparatus includes an alarm that is not masked nor transferred (step S2013: Yes), the WDM transmission apparatus 1910 transfers the alarm to the WDM transmission apparatus of the transfer destination (step S2014), whereafter the processing returns to step S2004.

Figure 21:
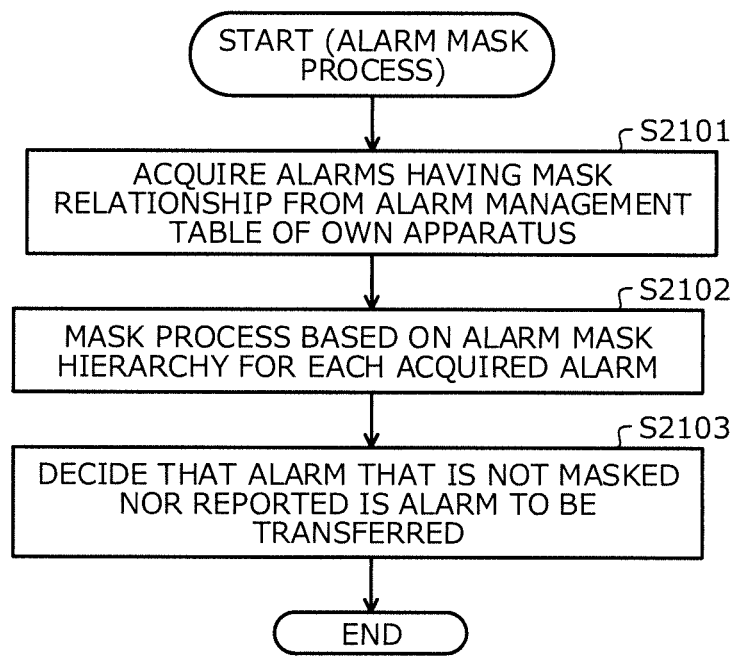
FIG. 21 is a flow chart illustrating an example of an alarm mask process according to the embodiment.

FIG. 21 is a flow chart illustrating an example of an alarm mask process according to the embodiment. For example, at step S2012 depicted in FIG. 20, the WDM transmission apparatus 1910 executes each of steps, for example, depicted in FIG. 21 as an alarm mask process.

First, the WDM transmission apparatus 1910 acquires alarms having a mask relationship with each other from the alarm management table of the own apparatus (step S2101). Alarms having a mask relationship with each other are alarms generated, for example, on the same path for WDM transmission. For example, the WDM transmission apparatus 1910 acquires a set of an alarm whose change is detected in the alarm management table of the own apparatus and another alarm whose alarm additional information (way information, CH information, ADD/DROP information) is coincident from the alarm management table of the own apparatus. At this time, for example, with regard to an alarm whose CH information is "0," it is decided that the CH information is always coincident.

Then, the WDM transmission apparatus 1910 performs a mask process based on the alarm mask hierarchy for each alarm acquired at step S2101 (step S2102). For example, the WDM transmission apparatus 1910 maps each of the alarms acquired at step S2101 to the alarm mask hierarchy based on the alarm name and the blade name of each of the alarms to decide a hierarchical relationship (priority order) of the acquired alarms. Then, the WDM transmission apparatus 1910 masks an alarm of a lower order (lower priority rank) from among the acquired alarms.

Then, the WDM transmission apparatus 1910 decides an alarm that is not masked nor reported to the transfer destination at step S2102 from among the alarms of the alarm management table of the own apparatus as an alarm to be transferred (step S2103), thereby ending the series of processes.

Figure 22:
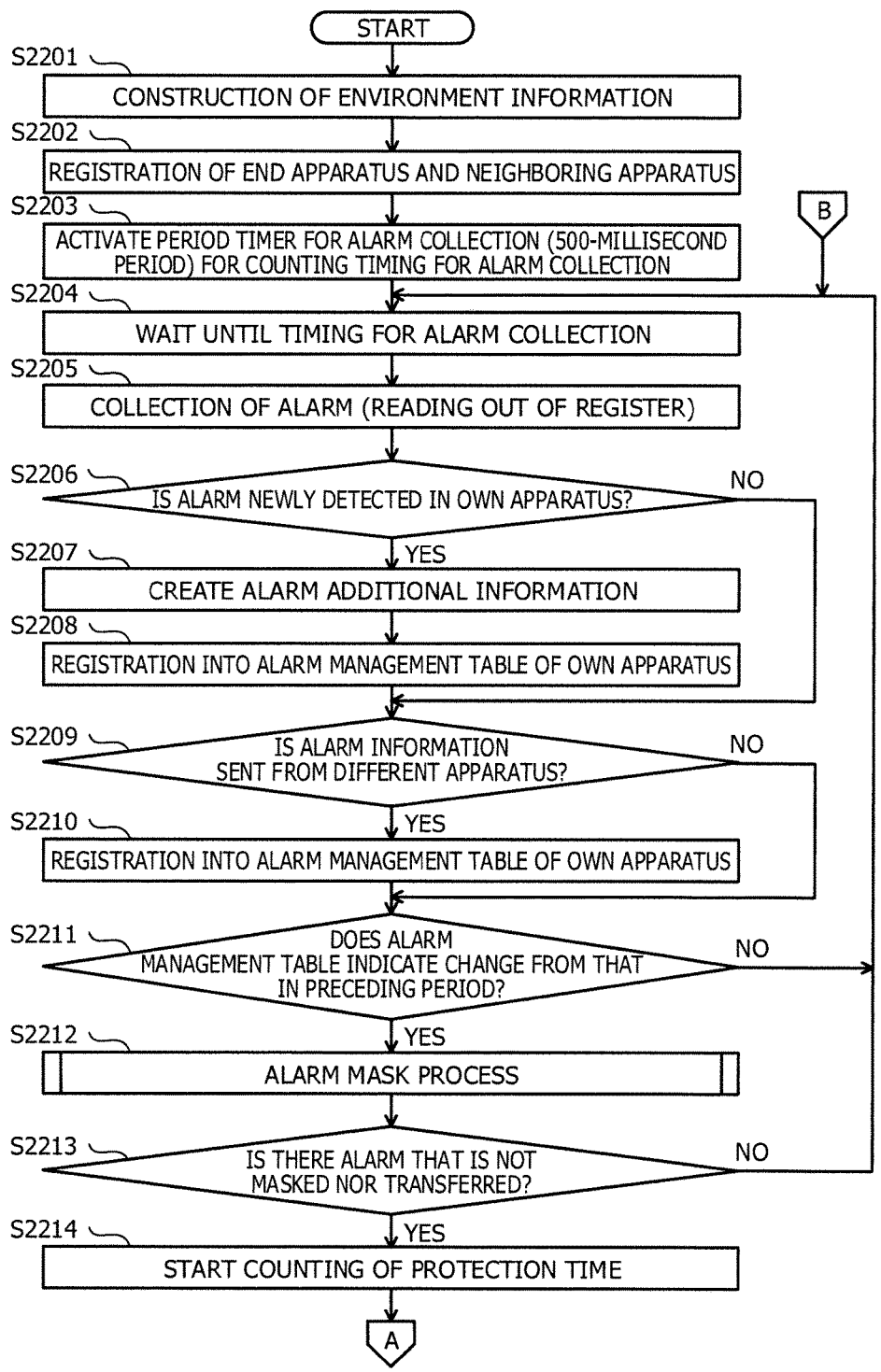
FIG. 22 is a flow chart (part 1) illustrating an example of a process by a WDM transmission apparatus (end apparatus) according to the embodiment.
Figure 23:
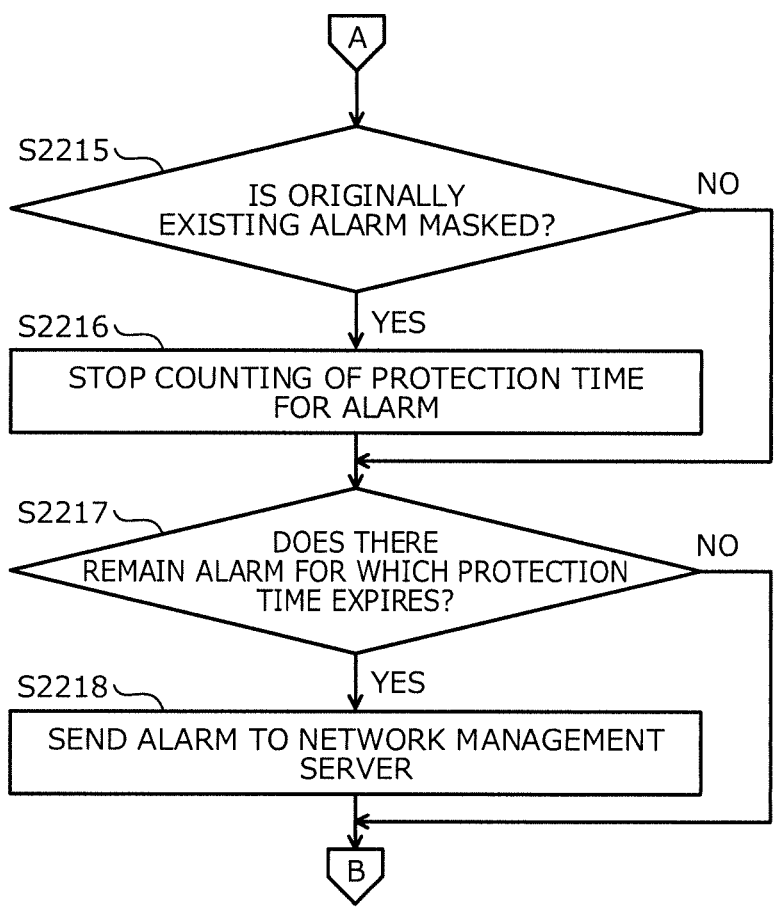
FIG. 23 is a flow chart (part 2) illustrating an example of a process by a WDM transmission apparatus (end apparatus) according to the embodiment.

FIGS. 22 and 23 are flow charts illustrating an example of a process by a WDM transmission apparatus (end apparatus) according to the embodiment. The WDM transmission apparatus 1910 depicted in FIG. 19 executes each of steps, for example, depicted in FIGS. 22 and 23 when it is provided as an end apparatus.

Steps S2201 to S2213 depicted in FIG. 22 are similar to those at steps S2001 to S2013 depicted in FIG. 20. It is to be noted, however, that, at step S2202, the WDM transmission apparatus 1910 registers, for example, an IP address of the network management server 130 as an address for transfer destination of an alarm from the own apparatus. The alarm mask process at step S2212 is similar, for example, to the alarm mask process illustrated in FIG. 21.

If it is decided at step S2213 that there remains an alarm that is not masked nor transferred (step S2213: Yes), the WDM transmission apparatus 1910 starts counting of a protection time for the alarm (step S2214). Then, the WDM transmission apparatus 1910 advances the processing to step S2215 depicted in FIG. 23. For example, the WDM transmission apparatus 1910 decides whether not an alarm registered just before but an alarm originally existing is masked or not by the alarm mask process at step S2212 (step S2215).

If an originally existing alarm is not masked at step S2215 (step S2215: No), the WDM transmission apparatus 1910 advances the processing to step S2217. If an originally existing alarm is masked (step S2215: Yes), the WDM transmission apparatus 1910 stops the counting of the protection time started at step S2214 for the alarm (step S2216).

Then, the WDM transmission apparatus 1910 decides whether or not there remains an alarm for which the protection time expires from among the alarms for which counting of the protection time is started at step S2214 (step S2217). If there remains no alarm whose protection time expires (step S2217: No), the WDM transmission apparatus 1910 returns the processing to step S2204 depicted in FIG. 22. If there remains an alarm whose protection time expires (step S2217: Yes), the WDM transmission apparatus 1910 sends the alarm to the network management server 130 (step S2218), whereafter the processing returns to step S2204 depicted in FIG. 22.

Figure 24:
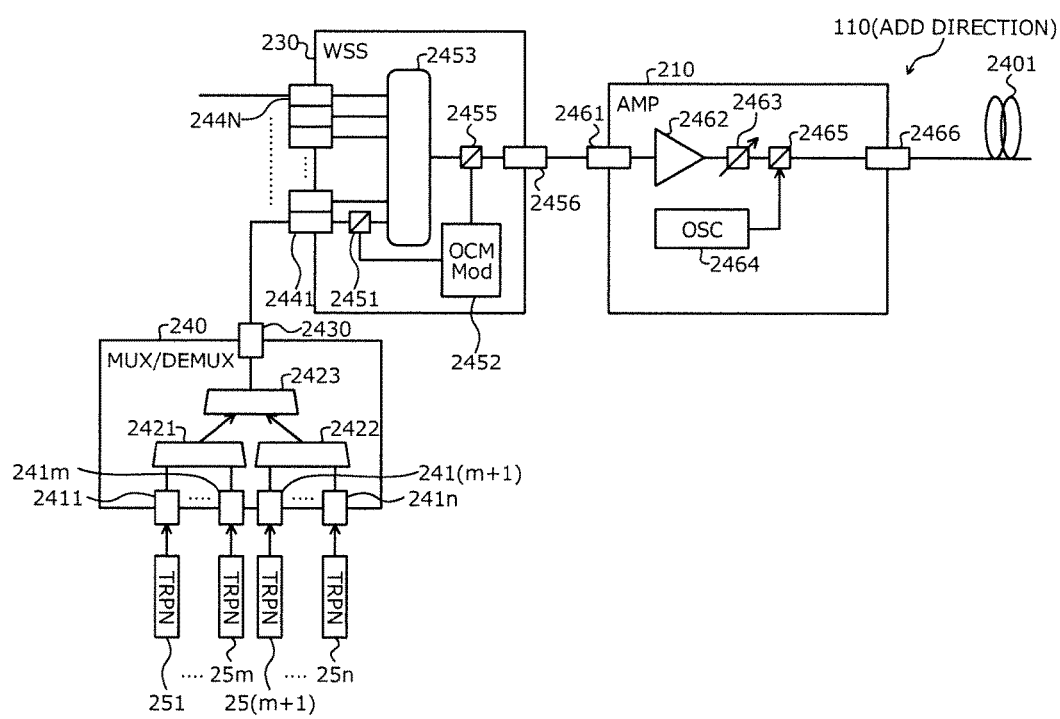
FIG. 24 is a view depicting an example of a hardware configuration in an ADD direction of a WDM transmission system according to the embodiment.

FIG. 24 is a view depicting an example of a hardware configuration in an ADD direction of a WDM transmission system according to the embodiment. In FIG. 24, like elements to those depicted in FIG. 2 are denoted by the same reference symbols, and overlapping description of them is omitted herein. In FIG. 24, a hardware configuration in the ADD direction of the MUX/DEMUX 240, WSS 230 and AMP 210 that implement the OADM in the WDM transmission system 110 is depicted.

As depicted in FIG. 24, the MUX/DEMUX 240 includes, as hardware constructs in the ADD direction, for example, optical inputting units 2411 to 241*n*, multiplexing units 2421, 2422 and 2423, and an optical outputting unit 2430.

To the optical inputting units 2411 to 241*m* (m<n) from among the optical inputting units 2411 to 241*n*, optical signals outputted from the TRPNs 251 to 25*m* from among the TRPNs 251 to 25*n* are inputted, respectively. Each of the optical inputting units 2411 to 241*m* outputs an optical signal inputted thereto to the multiplexing unit 2421.

To the optical inputting units 241(m+1) to 241*n* from among the optical inputting units 2411 to 241*n*, optical signals outputted from the TRPNs 25(m+1) to 25*n* from among the TRPNs 251 to 25*n* are inputted, respectively. Each of the optical inputting units 241(m+1) to 241*n* outputs an optical signal inputted thereto to the multiplexing unit 2422.

The multiplexing unit 2421 wavelength multiplexes each of optical signals outputted from the optical inputting units 2411 to 241*m* and outputs a wavelength multiplexed optical signal to the multiplexing unit 2423. The multiplexing unit 2422 wavelength multiplexes each of optical signals outputted from the optical inputting units 241(m+1) to 241*n* and outputs a wavelength multiplexed optical signal to the multiplexing unit 2423.

The multiplexing unit 2423 wavelength multiplexes each of optical signals outputted from the multiplexing units 2421 and 2422 and outputs wavelength multiplexed optical signals to the optical outputting unit 2430. The optical outputting unit 2430 outputs an optical signal outputted from the multiplexing unit 2423 to the WSS 230.

As depicted in FIG. 24, the WSS 230 includes, as hardware constructs in the ADD direction, optical inputting units 2441 to 244N, a branching unit 2451, an OCM module 2452 (OCM Mod), a selector 2453, a multiplexer 2455, and an optical outputting unit 2456. OCM is an abbreviation of optical channel monitor.

To the optical inputting unit 2441, an optical signal outputted from the MUX/DEMUX 240 is inputted. The optical inputting unit 2441 outputs the inputted optical signal to the branching unit 2451. To the optical inputting units 2442 to 244N, optical signals outputted from respective MUX/DEMUXes different from the MUX/DEMUX 240 are inputted. Each of the optical inputting units 2442 to 244N outputs an optical signal inputted thereto to the selector 2453.

The branching unit 2451 branches an optical signal outputted from the optical inputting unit 2441 and outputs each of branched optical signals to the OCM module 2452 and the selector 2453. The OCM module 2452 monitors the optical signal outputted from the branching unit 2451 and outputs an optical signal representative of a result of the monitoring to the multiplexer 2455. It is to be noted that, while, in the example depicted in FIG. 24, the OCM module 2452 monitors an optical signal outputted from the branching unit 2451, as an alternative configuration, the OCM module 2452 may monitor optical signals outputted from the optical inputting units 2442 to 244N.

The selector 2453 selects one of optical signals outputted from the optical inputting units 2442 to 244N and the branching unit 2451 and outputs the selected optical signal to the multiplexer 2455. The multiplexer 2455 multiplexes optical signals outputted from the selector 2453 and the OCM module 2452 and outputs the multiplexed optical signal to the optical outputting unit 2456. The optical outputting unit 2456 outputs the optical signal outputted from the multiplexer 2455 to the AMP 210.

As depicted in FIG. 24, the AMP 210 includes, as hardware constructs in the ADD direction, an optical inputting unit 2461, a post amplifier 2462, an amplifier 2463, an OSC module 2464, a multiplexer 2465, and an optical outputting unit 2466. OSC is an abbreviation of optical supervisor channel.

To the optical inputting unit 2461, an optical signal outputted from the WSS 230 is inputted. The optical inputting unit 2461 outputs the inputted optical signal to the post amplifier 2462. The post amplifier 2462 amplifies the optical signal outputted from the optical inputting unit 2461 and outputs the amplified optical signal to the amplifier 2463. The amplifier 2463 amplifies the optical signal outputted from the post amplifier 2462 and outputs the amplified optical signal to the multiplexer 2465. The OSC module 2464 detects, for example, a failure of the AMP 210 and outputs an optical signal including a control signal for the OSC indicative of the detected failure to the multiplexer 2465.

The multiplexer 2465 multiplexes each of optical signals outputted from the amplifier 2463 and the OSC module 2464 and outputs the multiplexed optical signal to the optical outputting unit 2466. The optical outputting unit 2466 sends the optical signal outputted from the multiplexer 2465 through a transmission path 2401.

Although the constructs in the ADD direction of the MUX/DEMUX 240, WSS 230 and AMP 210 are described above, the configuration similarly applies also to the constructs in the ADD direction, for example, of the MUX/DEMUX 740, WSS 730 and AMP 710 depicted in FIG. 7.

Figure 25:
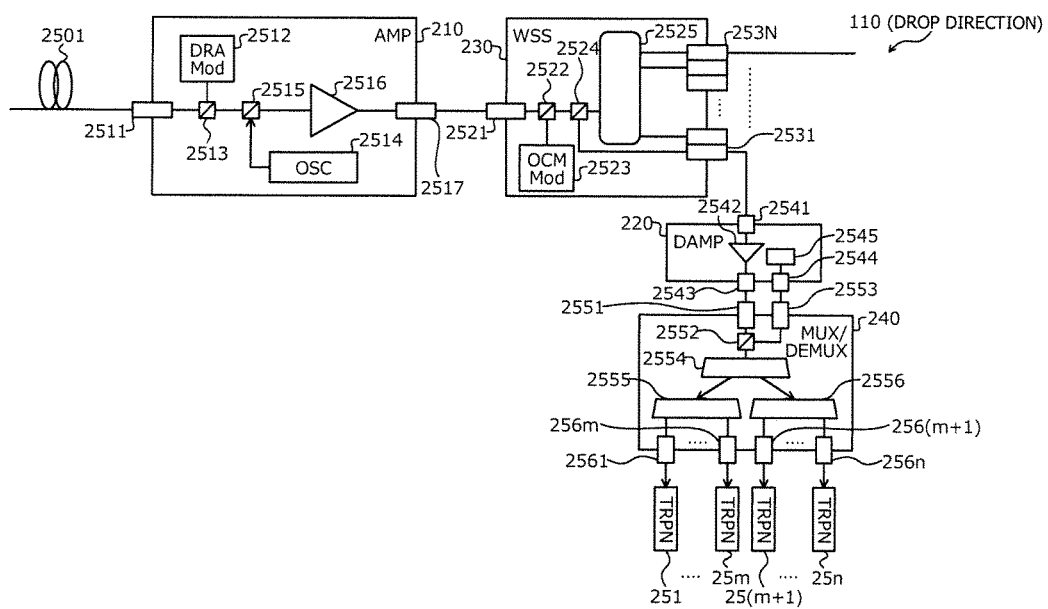
FIG. 25 is a view depicting an example of a hardware configuration in a DROP direction of a WDM transmission system according to the embodiment.

FIG. 25 is a view depicting an example of a hardware configuration in a DROP direction of a WDM transmission system according to the embodiment. In FIG. 25, like elements to those depicted in FIG. 2 are denoted by the same reference symbols, and overlapping description of them is omitted herein. In FIG. 25, a hardware configuration in the DROP direction of the AMP 210, DAMP 220, WSS 230 and MUX/DEMUX 240 that implement the OADM from within the WDM transmission system 110 is depicted.

As depicted in FIG. 25, the AMP 210 includes, as hardware constructs in the DROP direction, an optical inputting unit 2511, a DRA module 2512 (DRA Mod) and a multiplexer 2513. Further, the AMP 210 includes, as hardware constructs in the DROP direction, an OSC module 2514, a multiplexer 2515, a preamplifier 2516 and an optical outputting unit 2517. DRA is an abbreviation of distributed Raman amplification.

To the optical inputting unit 2511, an optical signal sent from a different WDM transmission apparatus through a transmission path 2501 is inputted. The optical inputting unit 2511 outputs the inputted optical signal to the multiplexer 2513. The DRA module 2512 oscillates excitation light for distributed Raman amplification and outputs the excitation light to the multiplexer 2513.

The multiplexer 2513 outputs an optical signal outputted from the optical inputting unit 2511 to the multiplexer 2515. Further, the multiplexer 2513 outputs excitation light outputted from the DRA module 2512 to the optical inputting unit 2511. Consequently, an optical signal sent from the transmission path 2501 is amplified by distributed Raman amplification and inputted to the optical inputting unit 2511. The OSC module 2514 detects a failure, for example, in the AMP 210 and outputs an optical signal including a control signal for the OSC indicative of the detected failure to the multiplexer 2515.

The multiplexer 2515 multiplexes each of optical signals outputted from the multiplexer 2513 and the OSC module 2514 and outputs the multiplexed optical signal to the preamplifier 2516. The preamplifier 2516 amplifies the optical signal outputted from the multiplexer 2515 and outputs the amplified optical signal to the optical outputting unit 2517. The optical outputting unit 2517 outputs the optical signal outputted from the preamplifier 2516 to the WSS 230.

As depicted in FIG. 25, the WSS 230 includes, as hardware constructs in the DROP direction, an optical inputting unit 2521, a branching unit 2522, an OCM module 2523 (OCM Mod), a branching unit 2524, a selector 2525 and optical outputting units 2531 to 253N.

To the optical inputting unit 2521, an optical signal outputted from the AMP 210 is inputted. The optical inputting unit 2521 outputs the inputted optical signal to the branching unit 2522. The branching unit 2522 branches the optical signal outputted from the optical inputting unit 2521 and outputs the branched optical signals to the OCM module 2523 and the branching unit 2524. The OCM module 2523 monitors the optical signal outputted from the branching unit 2522.

The branching unit 2524 branches an optical signal outputted from the branching unit 2522 and outputs the branched optical signals to the selector 2525 and the optical outputting unit 2531. The selector 2525 outputs the optical signal outputted from the branching unit 2524 to one of the optical outputting units 2532 to 253N.

The optical outputting unit 2531 outputs an optical signal outputted from the branching unit 2524 to the DAMP 220. Each of the optical outputting units 2532 to 253N outputs an optical signal outputted from the selector 2525 to a WDM transmission apparatus different from the DAMP 220.

As depicted in FIG. 25, the DAMP 220 includes, as hardware constructs in the DROP direction, an optical inputting unit 2541, an amplifier 2542, an optical outputting unit 2543, another optical inputting unit 2544 and a monitoring unit 2545.

To the optical inputting unit 2541, an optical signal outputted from the WSS 230 is inputted. The optical inputting unit 2541 outputs the inputted optical signal to the amplifier 2542. The amplifier 2542 amplifies the optical signal outputted from the optical inputting unit 2541 and outputs the amplified optical signal to the optical outputting unit 2543. The optical outputting unit 2543 outputs the optical signal outputted from the amplifier 2542 to the MUX/DEMUX 240.

To the optical inputting unit 2544, an optical signal outputted from the MUX/DEMUX 240 is inputted. The optical inputting unit 2544 outputs the inputted optical signal to the monitoring unit 2545. The monitoring unit 2545 monitors an alarm of the MUX/DEMUX 240 included in the optical signal outputted from the optical inputting unit 2544.

As depicted in FIG. 25, the MUX/DEMUX 240 includes, as hardware constructs in the DROP direction, an optical inputting unit 2551, a branching unit 2552, an optical outputting unit 2553, demultiplexing units 2554, 2555 and 2556 and optical outputting units 2561 to 256n.

To the optical inputting unit 2551, an optical signal outputted from the DAMP 220 is inputted. The optical inputting unit 2551 outputs the inputted optical signal to the branching unit 2552. The branching unit 2552 branches the optical signal outputted from the optical inputting unit 2551 and outputs the branched optical signals to the optical outputting unit 2553 and the demultiplexing unit 2554. The optical outputting unit 2553 outputs the optical signal outputted from the branching unit 2552 to the DAMP 220. The optical signal outputted from the optical outputting unit 2553 to the DAMP 220 includes an alarm of the MUX/DEMUX 240.

The demultiplexing unit 2554 wavelength demultiplexes an optical signal outputted from the branching unit 2552 and outputs the wavelength demultiplexed optical signals to each of the demultiplexing units 2555 and 2556. The demultiplexing unit 2555 wavelength demultiplexes the optical signal outputted from the demultiplexing unit 2554 and outputs the wavelength demultiplexed optical signals to each of the optical outputting units 2561 to 256m from among the optical outputting units 2561 to 256n. The demultiplexing unit 2556 wavelength demultiplexes the optical signal outputted from the demultiplexing unit 2554 and outputs the wavelength demultiplexed optical signals to each of the optical outputting units 256(m+1) to 256n from among the optical outputting units 2561 to 256n.

The optical outputting units 2561 to 256m from among the optical outputting units 2561 to 256n output an optical signal outputted from the demultiplexing unit 2555 to the TRPNs 251 to 25m from among the TRPNs 251 to 25n, respectively. The optical outputting units 256(m+1) to 256n from among the optical outputting units 2561 to 256n output an optical signal outputted from the demultiplexing unit 2556 to the TRPNs 25(m+1) to 25n from among the TRPNs 251 to 25n, respectively.

It is to be noted that, while the example depicted in FIG. 25 is directed to the configuration wherein the DAMP 220 is provided between the WSS 230 and the MUX/DEMUX 240, as an alternative configuration, the DAMP 220 may be provided between the AMP 210 and the WSS 230, for example, as depicted in FIG. 2.

While the constructs in the DROP direction of the AMP 210, DAMP 220, WSS 230 and MUX/DEMUX 240 are described above, the configuration similarly applies also to the constructs in the DROP direction of the AMP 710, DAMP 720, WSS 730 and MUX/DEMUX 740 in FIG. 7.

Figure 26:
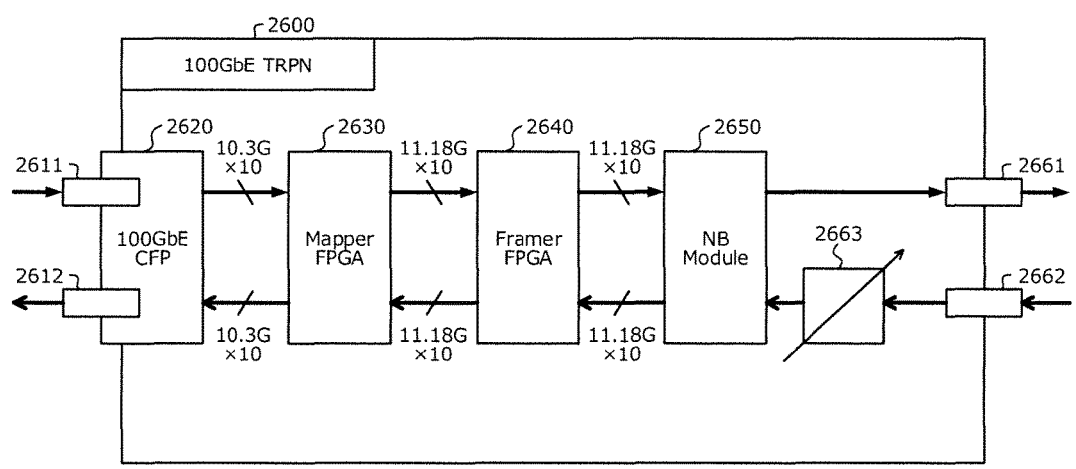
FIG. 26 is a view depicting an example of a hardware configuration of a TRPN according to the embodiment.

FIG. 26 is a view depicting an example of a hardware configuration of a TRPN according to the embodiment. Each of the TRPNs 251 to 25n described above may be implemented, for example, by a TRPN 2600 (100-GbE TRPN) depicted in FIG. 26. 100 GbE is an abbreviation of 100 gigabit Ethernet (100 Gbit Ethernet). It is to be noted that Ethernet is a registered trademark.

The TRPN 2600 includes an optical inputting unit 2611, an optical outputting unit 2612, a CFP module 2620 (100-GbE CFP), a mapper FPGA 2630 and a framer FPGA 2640. The TRPN 2600 further includes an NB module 2650, an electric outputting unit 2661, an electric inputting unit 2662 and a preamplifier 2663. CFP is an abbreviation of centum gigabit form-factor pluggable. NB is an abbreviation of narrow band.

To the CFP module 2620, an optical signal from the MUX/DEMUX 240 is inputted through the optical inputting unit 2611. The CFP module 2620 converts the inputted optical signal into an electric signal and outputs the converted electric signal to the mapper FPGA 2630. Further, the CFP module 2620 converts the electric signal outputted from the mapper FPGA 2630 into an optical signal and outputs the converted optical signal to the MUX/DEMUX 240 through the optical outputting unit 2612.

The mapper FPGA 2630 performs demapping of a signal outputted from the CFP module 2620 and outputs a frame signal obtained by the demapping to the framer FPGA 2640. Further, the mapper FPGA 2630 performs mapping of a frame signal outputted from the frame FPGA 2640 and outputs an electric signal obtained by the mapping to the CFP module 2620.

The framer FPGA 2640 deframes a frame signal outputted from the mapper FPGA 2630 and outputs a signal obtained by the deframing to the NB module 2650. Further, the framer FPGA 2640 frames a signal outputted from the NB module 2650 and outputs a frame signal obtained by the framing to the mapper FPGA 2630.

The NB module 2650 performs a narrowband process for processing a signal of a narrow band outputted from the framer FPGA 2640 and outputs the narrowband processed signal to the electric outputting unit 2661. Further, the NB module 2650 performs a narrowband process for converting a signal outputted from the preamplifier 2663 into a narrowband signal and outputs the narrowband processed signal to the framer FPGA 2640.

The electric outputting unit 2661 outputs a signal outputted from the NB module 2650 to the client side. To the electric inputting unit 2662, a signal outputted from the client side is inputted. The electric inputting unit 2662 outputs the inputted signal to the preamplifier 2663. The preamplifier 2663 amplifies the signal outputted from the electric inputting unit 2662 and outputs the amplified signal to the NB module 2650.

Figure 27:
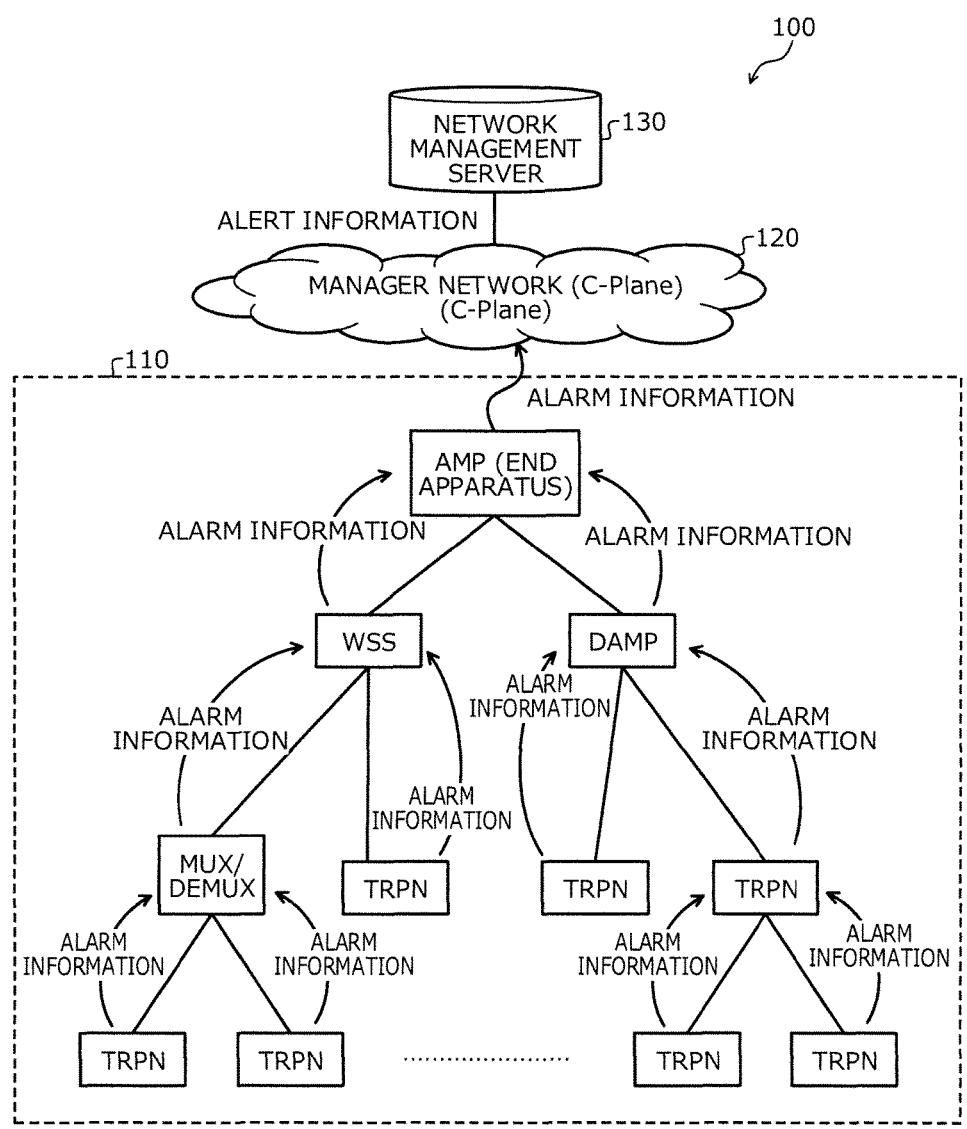
FIG. 27 is a view illustrating an example of arrangement of WDM transmission apparatus in a WDM transmission system according to the embodiment.

FIG. 27 is a view illustrating an example of arrangement of WDM transmission apparatus in a WDM transmission system according to the embodiment. In FIG. 27, like elements to those depicted in FIG. 1 are denoted by the same reference symbols, and overlapping description of them is omitted herein. Each WDM transmission apparatus in the WDM transmission system 110 forms, as an example, a path for alarm transfer of a tree shape as depicted in FIG. 27. By devising a manner of arrangement of WDM transmission apparatus in the WDM transmission system 110, a frequency band between neighboring WDM transmission apparatus may be used efficiently.

First, an alarm generated in a WDM transmission apparatus spaced away from a terminal end is transferred through many WDM transmission apparatus. Therefore, in order to reduce the number of alarms that pass between neighboring WDM transmission apparatus, a WDM transmission apparatus from which many alarms are generated is disposed in the proximity of the terminal end. From such a reason that, from characteristics of the WDM, TRPN signals are multiplexed by a MUX/DEMUX such that a multiplexed signal flows, there is a tendency that many alarms are generated in an AMP or a WSS in comparison with a TRPN. Further, where the number of stages of WDM transmission apparatus by which an alarm is transferred is great, the reporting to the manager is delayed, and therefore, the number of stages for transferring alarms is preferably decreased as far as possible.

Therefore, for example, in a path for alarm transfer formed by each of WDM transmission apparatus that form a path for optical transmission in the ADD direction, the TRPN may be disposed at the most upstream while the MUX/DEMUX, WSS and AMP are disposed at the downstream with respect to the TRPN. Consequently, the MUX/DEMUX, WSS and AMP from which many alarms are likely to be generated are disposed at the downstream side of the path for alarm transfer in the ADD direction, and the total number of times of transfer of alarms may be reduced thereby.

For example, the number of spread alarms of a malfunction generated in a WDM transmission apparatus (TRPN) at the client side is comparatively small, and the number of spread alarms of a malfunction generated in a WDM transmission apparatus (AMP) at the network side is great. Taking notice of this, by applying a bucket relay to the path for alarm transfer from the WDM transmission apparatus (TRPN) at the client side toward the WDM transmission apparatus (AMP) at the network side, wasteful communication between WDM transmission apparatus may be reduced.

In this manner, the WDM transmission apparatus 1910 according to the present embodiment receives an alarm regarding communication detected by a first transmission apparatus from a second transmission apparatus, detects an alarm regarding communication generated in the own apparatus, and performs a mask process of each of the alarms. The first transmission apparatus sometimes is the second transmission apparatus and sometimes is a transmission apparatus different from the second transmission apparatus. The WDM transmission apparatus 1910 sends, where the own apparatus is a neighboring apparatus, an alarm that is not masked by a mask process to a third transmission apparatus. On the other hand, where the own apparatus is an end apparatus, the WDM transmission apparatus 1910 sends an alarm that is not masked by a mask process to a given apparatus.

Consequently, each of the WDM transmission apparatus in the WDM transmission system 110 may transfer, while performing a mask process, alarms in series (in a bucket relay fashion) to the network management server 130. Therefore, even if, for example, an aggregation apparatus for aggregating alarms of each of the WDM transmission apparatus in the WDM transmission system 110 is not provided, the traffic (communication amount) desirable for transfer of alarms may be reduced. For example, if a shelf type WDM transmission apparatus that uses an existing aggregation apparatus is replaced by a blade type WDM transmission apparatus that does not use an aggregation apparatus, a high load state by generation of alarms may be suppressed.

For example, alarms that are sent to a third transmission apparatus without being masked by a mask process may be only alarms detected by the first transmission apparatus, only alarms detected by the WDM transmission apparatus 1910 or both alarms.

The first transmission apparatus is, for example, a WDM transmission apparatus at the upstream side with respect to the WDM transmission apparatus 1910 on the path for alarm transfer from among the plurality of WDM transmission apparatus in the WDM transmission system 110. The second transmission apparatus is, for example, a WDM transmission apparatus that neighbors at the upstream side of the WDM transmission apparatus 1910 on the path for alarm transfer from among the plurality of WDM transmission apparatus in the WDM transmission system 110. The first transmission apparatus and the second transmission apparatus may be the same transmission apparatus or may be transmission apparatus different from each other. The third transmission apparatus is a transmission apparatus that neighbors at the downstream side of the WDM transmission apparatus 1910 on the path for alarm transfer from among the plurality of WDM transmission apparatus in the WDM transmission system 110.

Although the foregoing description is given of the configuration where the WDM transmission system 110 is an OADM, the WDM transmission system 110 is not limited to the OADM but may be formed as various WDM transmission systems that are implemented by a plurality of WDM transmission apparatus that are coupled to each other and perform optical transmission.

As described above, with the transmission apparatus, alarm transfer method and alarm transfer system, the traffic desirable for transfer of an alarm may be reduced.

For example, if each of the WDM transmission apparatus of the WDM transmission system 110 depicted in FIG. 1 individually sends an alarm to the network management server 130, a large number of spread alarms are sent to the network management server 130 in addition to cause alarms. Therefore, it is difficult for the network management server 130 to specify the cause alarms from among the alarms sent to the network management server 130. Accordingly, it is difficult to specify a malfunction location in the WDM transmission system 110, and much time is taken for failure restoration.

Alternatively, for example, it may be advisable that an aggregation apparatus that manages coupling information of each of the WDM transmission apparatus in the WDM transmission system 110 masks spread alarms from among alarms sent from each of the WDM transmission apparatus such that only cause alarms are transferred to the network management server 130. However, since such an aggregation apparatus as just described is not provided, for example, in a blade type WDM transmission apparatus, it is difficult to transfer only cause alarms to the network management server 130.

In contrast, with the embodiment described above, alarms from individual ones of the blade type WDM transmission apparatus are transferred in accordance with a bucket relay fashion to the network management server 130 by the individual WDM transmission apparatus, and each of the WDM transmission apparatus may mask an alarm. Consequently, the traffic desirable for transfer of an alarm from a WDM transmission apparatus to the network management server 130 may be reduced. For example, in the stage of transferring among WDM transmission apparatus, masking of a transfer alarm depending upon a comprehensive relationship between an alarm received by each WDM transmission apparatus and an alarm of the WDM transmission apparatus itself may be implemented by a simple contrivance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission apparatus among a plurality of transmission apparatuses, the transmission apparatus comprising:
   an interface circuitry configured to be coupled to other interface circuitry included in other transmission apparatus among the plurality of transmission apparatuses to form a signal transmission path by coupling at least a part of the transmission apparatus and the other transmission apparatus through the interface circuitry and the other interface circuitry, wherein the interface circuitry is configured to amplify a signal received from an upstream path in the signal transmission path and transmit the amplified signal to a downstream path in the signal transmission path when the interface circuitry is coupled to the other transmission apparatus downstream of the transmission apparatus;
   a memory; and
   a processor coupled to the memory and the interface circuitry, the processor being configured to
      execute a reception process that includes receiving, through the interface circuitry, a first alarm from a second transmission apparatus, the first alarm being an alarm detected in a first transmission apparatus, the first transmission apparatus being any of the plurality of transmission apparatuses and being upstream of the second transmission apparatus in the signal transmission path, the second transmission apparatus being any of the plurality of transmission apparatuses and being upstream of the transmission apparatus in the signal transmission path,
      execute a detection process that includes detecting a second alarm of the transmission apparatus,
      execute a mask process when there are the first and second alarms within a predetermined time period, the mask process being configured to obtain a first priority associated with the first alarm and a second priority associated with the second alarm, compare the first priority and the second priority, and mask the second alarm when the second priority is less than the first priority, wherein the second alarm is associated with the second priority less than the first priority when the first apparatus is an apparatus upstream of the transmission apparatus, and
      execute a sending process that includes sending an alarm that is not masked by the mask process to at least any of the other transmission apparatus as a third transmission apparatus downstream of the transmission apparatus and a fourth transmission apparatus, the fourth transmission apparatus being a given apparatus different from any of the plurality of transmission apparatuses.

2. The transmission apparatus according to claim 1,
wherein the plurality of transmission apparatuses form a transfer path for transferring an alarm to the given apparatus,
the first transmission apparatus is a transmission apparatus at the upstream side with respect to the transmission apparatus on the transfer path from among the plurality of transmission apparatuses,
the second transmission apparatus is a transmission apparatus neighboring at the upstream side of the transmission apparatus on the transfer path from among the plurality of transmission apparatuses, and
the third transmission apparatus is a transmission apparatus neighboring at the downstream side of the transmission apparatus on the transfer path from among the plurality of transmission apparatuses.

3. The transmission apparatus according to claim 2,
wherein the sending process includes:
sending, where the transmission apparatus is not a transmission apparatus at the most downstream on the transfer path from among the plurality of transmission apparatuses, the alarm that is not masked to the third transmission apparatus, and
sending, where the transmission apparatus is the transmission apparatus at the most downstream, the alarm that is not masked to the given apparatus.

4. The transmission apparatus according to claim 2,
wherein the sending process includes
waiting, where the transmission apparatus is a transmission apparatus at the most downstream on the transfer path from among the plurality of transmission apparatuses, for a given period of time after the mask process and sending, when the alarm that is not masked is not masked by the mask process within the given period of time, the alarm that is not masked to the given apparatus.

5. The transmission apparatus according to claim 1,
wherein the reception process includes
receiving, from the second transmission apparatus, the first alarm detected in the first transmission apparatus and information specifiable a path of the communication on which the first alarm detected in the first transmission apparatus is detected and a position of the first transmission apparatus on the path of the communication,
wherein the mask process includes
masking the alarms based on the information received by the reception process, and
wherein the sending process includes
sending, to the third transmission apparatus, the alarm that is not masked and information specifiable a path of the communication on which the alarm that is not masked is detected and a position on the path of the communication of a transmission apparatus in which the alarm that is not masked is detected or sending the alarm that is not masked to the given apparatus.

6. The transmission apparatus according to claim 5,
wherein the mask process includes
masking the alarms based on a result of comparison between the path of the communication specified by the information and a path of the communication on which the second alarm is detected by the detection process and a result of comparison between the position of the first transmission apparatus specified by the information and a position of the transmission apparatus on the path of the communication.

7. The transmission apparatus according to claim 5,
wherein the information received by the reception process includes a type of the first transmission apparatus, and a way, a wavelength channel and a signal direction of the path of the communication on which the first alarm detected in the first transmission apparatus is detected, and
wherein the information sent by the sending process includes a type of the transmission apparatus in which the alarm that is not masked is detected, and a way, a wavelength channel and a signal direction of the path of communication on which the alarm that is not masked is detected.

8. The transmission apparatus according to claim 1,
wherein the mask process includes masking an alarm detected by a transmission apparatus at the more downstream on the same path from among the alarms detected on the same path of the communication.

9. An alarm transfer method, performed by a transmission apparatus among a plurality of transmission apparatuses, the transmission apparatus having an interface circuitry configured to be coupled to other interface circuitry included in other transmission apparatus among the plurality of transmission apparatuses to form a signal transmission path by coupling at least a part of the transmission apparatus and the other transmission apparatus through the interface circuitry and the other interface circuitry, the interface circuitry is configured to amplify a signal received from an upstream path in the signal transmission path and transmit the amplified signal to a downstream path in the signal transmission path when the interface circuitry is coupled to the other transmission apparatus downstream of the transmission apparatus, the method comprising:

executing a reception process for receiving, through the interface circuitry, a first alarm from a second transmission apparatus, the first alarm being an alarm detected in a first transmission apparatus, the first transmission apparatus being any of the plurality of transmission apparatuses and being upstream of the second transmission apparatus in the signal transmission path, the second transmission apparatus being any of the plurality of transmission apparatuses and being upstream of the transmission apparatus in the signal transmission path;

executing a detection process for detecting a second alarm of the transmission apparatus;

executing a mask process when there are the first and second alarms within a predetermined time period, the mask process being configured to obtain a first priority associated with the first alarm and a second priority associated with the second alarm, compare the first priority and the second priority, and mask the second alarm when the second priority is less than the first priority, wherein the second alarm is associated with the second priority less than the first priority when the first apparatus is an apparatus upstream of the transmission apparatus; and executing a sending process for sending an alarm that is not masked by the mask process to at least any of the other transmission apparatus as a third transmission apparatus downstream of the transmission apparatus and a fourth transmission apparatus, the fourth transmission apparatus being a given apparatus different from any of the plurality of transmission apparatuses.

10. An alarm transfer system, comprising:
a plurality of transmission apparatuses, each of the plurality of transmission apparatuses including an interface circuitry, the interface circuitry being configured to be coupled to an interface circuitry of any of the plurality of transmission apparatuses, the plurality of transmission apparatuses being configured to form a signal transmission path by coupling at least a part of the plurality of transmission apparatuses through the interface circuitry, wherein the interface circuitry is configured to amplify a signal received from an upstream path in the signal transmission path and transmit the amplified signal to a downstream path in the signal transmission path when the interface circuitry is coupled to any of the plurality of transmission apparatuses;

wherein each of the plurality of transmission apparatuses is configured to execute a reception process that includes receiving, through the interface circuitry, a first alarm from a second transmission apparatus, the first alarm being an alarm detected in a first transmission apparatus, the first transmission apparatus being any of the plurality of transmission apparatuses and being upstream of the second transmission apparatus in the signal transmission path, the second transmission apparatus being any of the plurality of transmission apparatuses and being upstream of the transmission apparatus in the signal transmission path, execute a detection process that includes detecting a second alarm of the transmission apparatus, when there are the first and second alarms within a predetermined time period, the mask process being configured to obtain a first priority associated with the first alarm and a second priority associated with the second alarm, compare the first priority and the second priority, and mask the second alarm when the second priority is less than the first priority, wherein the second alarm is associated with the second priority less than the first priority when the first apparatus is an apparatus upstream of the transmission apparatus, and execute a sending process that includes sending an alarm that is not masked by the mask process to at least any of a third transmission apparatus and a fourth transmission apparatus, the third transmission apparatus being any of the plurality of transmission apparatuses and being downstream of the transmission apparatus, the fourth transmission apparatus being a given apparatus different from any of the plurality of transmission apparatuses.

* * * * *